(12) United States Patent
Yi et al.

(10) Patent No.: US 7,058,038 B2
(45) Date of Patent: Jun. 6, 2006

(54) METHOD FOR ALLOCATING COMMON PACKET CHANNELS

(75) Inventors: Seung June Yi, Seoul (KR); Young Dae Lee, Kyonggi-do (KR); Sung Lark Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 976 days.

(21) Appl. No.: 09/773,574

(22) Filed: Feb. 2, 2001

(65) Prior Publication Data

US 2001/0012301 A1  Aug. 9, 2001

(30) Foreign Application Priority Data

Feb. 2, 2000  (KR) .............. P 2000-5065
Feb. 11, 2000  (KR) .............. P 2000-6361
Feb. 24, 2000  (KR) .............. P 2000-9007

(51) Int. Cl.
  *H04B 7/216*  (2006.01)
(52) U.S. Cl. ............ 370/335; 370/342; 370/329
(58) Field of Classification Search ........... 370/328, 370/329, 335, 437, 441, 468, 342
See application file for complete search history.

(56) References Cited

U.S. PATENT DOCUMENTS

| | | | |
|---|---|---|---|
| 6,169,759 B1 * | 1/2001 | Kanterakis et al. ......... 375/130 |
| 6,480,525 B1 * | 11/2002 | Parsa et al. ................ 375/141 |
| 6,621,807 B1 * | 9/2003 | Jung et al. .................. 370/335 |
| 6,643,318 B1 * | 11/2003 | Parsa et al. ................ 375/141 |
| 6,674,739 B1 * | 1/2004 | Lee et al. ................... 370/335 |
| 2001/0053140 A1 * | 12/2001 | Choi et al. ................. 370/335 |
| 2002/0018457 A1 * | 2/2002 | Choi et al. ................. 370/342 |
| 2002/0080745 A1 * | 6/2002 | Dick et al. ................. 370/335 |

FOREIGN PATENT DOCUMENTS

EP  1 089 587 A2  4/2001

(Continued)

OTHER PUBLICATIONS

ETSI TS 125 214 V3.1.1 (Jan. 2000), "Universal Mobile Telecommunications Systems (UMTS); Physical Layer Procedures (FDD)," (3G TS 25.214 version 3.1.1 Release 1999, Jan. 2000 (XP-002207980).

(Continued)

*Primary Examiner*—Ricky Ngo
*Assistant Examiner*—Christine Ng
(74) *Attorney, Agent, or Firm*—Fleshner & Kim, LLP

(57) ABSTRACT

A method for allocating common packet channels in a next generation mobile communication system is disclosed. A mobile station maps a signature for indicating a specific common packet channels with scrambling codes and transmits an access preamble including the signature to a system to request allocation of the channel. The system maps a signature of a channel assignment for a desired common packet channel with the scrambling codes to transmit it to the mobile station. The mobile station transmits a message to the system through a corresponding physical channel in accordance with the channel assignment. The mobile station can transmit a collision detection preamble for preventing channel collision to the system by mapping with a specific scrambling code set. At this time, the system can select a scrambling code from a scrambling code set designated by the collision detection preamble and can map the selected scrambling code with the channel assignment.

46 Claims, 15 Drawing Sheets

FOREIGN PATENT DOCUMENTS

| | | |
|---|---|---|
| JP | 2001-157251 | 6/2001 |
| JP | 2003-504935 | 4/2003 |
| JP | 2003-516021 | 7/2003 |
| WO | WO 01/05050 A1 | 1/2001 |
| WO | WO 01/39416 A1 | 5/2001 |

OTHER PUBLICATIONS

ETSI TS 125 213 V3.1.1 (Jan. 2000), "Universal Mobile Telecommunications Systems (UMTS); Physical Layer Procedures (FDD)," (3G TS 25.213 version 3.1.1 Release 1999, Jan. 2000 (XP-002235041).

3GPP TSG RAN Meeting #7, Document R1-00-0233, Agreed Change Requests to TS 25.214(1), Madrid, Spain, Mar. 13-15, 2000 (XP-002203811).

"CPCH Access Methods Comparison" TSG-RAN Working Group 1 meeting #10 Bejing (China), Jan. 18-Jan. 21, 2000 (TSGR1#10(00)0106).

"Dynamic OVSF Code Assignment for PCPCH Message Part", TSG-RAN Working Group 1 meeting #10 Jan. 18-21, Bejing, China (RSGR1#10(00)01).

JP Office Action dated Dec. 7, 2004 (full text and English Translation).

* cited by examiner

METHOD FOR ALLOCATING COMMON PACKET CHANNELS

BACKGROUND OF THE INVENTION

1. Field of the Invention

The present invention relates to a mobile communications system, and more particularly to a method for allocating common packet channels in a next generation mobile communication system.

2. Background of the Related Art

FIG. 1 shows a transmission structure of a related art common packet channel (CPCH). Referring to FIG. 1, a related art CPCH includes a CPCH status indicator channel (CSICH) for transmitting status information of a CPCH of a current cell from a base station and, an access preamble (AP), which is transmitted by a mobile station that received the CSICH in order to request allocation of a specific CPCH. An AP acquisition indicator channel (AP-AICH) is provided for transmitting a response signal to the AP by the base station, and a collision detection preamble (CD-P) is provided for detecting a collision of the CPCH generated when a plurality of mobile stations request the same CPCH. The CD-P thereafter releases the collision. Next, a collision detection preamble acquisition indicator channel (CD-ICH) is provided for transmitting from the base station a response to the CD-P, and a power control preamble (PC-P), having a 0 or 8 slot length, is provided for setting transmission power level before transmission of a message part. The CPCH also includes a down link-dedicated physical control channel (DL-DPCCH) for implementing closed loop power control (CL-PC), and a message part for transmitting user packet data. The message part includes a data part and a control part.

A related art procedure for transmitting the CPCH will next be described.

First, a mobile station which desires to transmit packet data identifies a currently available (or non-available) channel by referring to a CSICH being broadcasted from a base station. The mobile station tries to access the base station when a CPCH that can support a desired transmission data rate is vacant.

The mobile station then transmits an AP to the base station to inform a desired CPCH. That is, the mobile station respectively selects an AP signature and an access slot, and transmits an AP consisting of the selected AP signature and access slot to the base station in compliance with a start point of the access slot. The AP signature indicates each CPCH.

Thereafter, the mobile station increases transmission power to retransmit the AP in compliance with the start point of the access slot when an acquisition response of the AP is not received after a prescribed time period. Such retransmission is repeated for a number of threshold times.

The base station receives the AP from the mobile station to sense a maximum data rate or a minimum spreading factor requested by the mobile station. Then, the base station determines whether to allocate a CPCH requested by the mobile station after considering resource usage of the current CPCH and an amount of total traffic.

Meanwhile, in an optical band code division multiplexing access communication system, since one cell can serve up to 16 CPCHs or less, 16 signatures exist. The mobile station selects one of the 16 signatures to transmit it to the base station.

At this time, if a minimum spreading factor $SF_{min}$ of a CPCH serviced by a cell is below 32, the 16 signatures are one-to-one mapped with a node having a spreading factor of 16 in a channelization orthogonal variable spreading factor (OVSF) code tree, and then transmitted (see FIG. 2, for example). This means that the 16 APs are respectively mapped with a channelization code of a message part of the CPCH one to one, and respectively indicate 16 CPCHs.

Subsequently, the base station determines whether the CPCH can be allocated. If the CPCH can be allocated, the base station transmits the signature equal to the received AP as an acknowledgment (ACK) signal in compliance with the start point of the access slot. If the CPCH cannot be allocated, the base station transmits an inverted signature of the received AP as a non-acknowledgment (NACK) in compliance with the start point of the access slot.

When a number of mobile stations simultaneously transmit an AP with the same signature, the base station does not identify the mobile stations from the same signature, and therefore transmits the ACK signal to all mobile stations. Thus, the mobile stations that received the ACK signal transmit a CD-P to the base station to detect a collision. Any one of the 16 signatures equal to the AP is used as the CD-P. Likewise, any one of 16 signatures is used as scrambling codes in the same manner as the AP, but codes shifted as much as 4096 chips are used as the scrambling codes.

When the base station receives one CD-P, the base station determines that a collision has not occurred, and transmits the signature equal to that of the received CD-P to the mobile station through the CD-ICH. However, when the base station receives a number of CD-Ps, the base station determines that a collision has occurred, and selects the CD-P having the highest power among the received CD-Ps, and transmits the CD-ICH to the corresponding mobile station.

Furthermore, the base station transmits a CA-ICH containing channel information in a signature format to the mobile station. At this time, the channel information contained in the CA-ICH includes a channelization code and a scrambling code of a down link-dedicated physical control channel (DL-DPCCH) and a physical common packet channel (PCPCH). The CD-ICH and the CA-ICH are simultaneously transmitted to the mobile station.

Afterwards, the mobile station that received the CD-ICH and the CA-ICH starts to transmit a message. The mobile station controls transmitting power using the PC-P, if necessary, to start to transmit the message consisting of a data part and a control part. Meanwhile, the base station transmits the DL-DPCCH to the mobile station. The mobile station transmits the PC-P for a constant time of 0 or 8 slots through the signature information of the CA-ICH before transmitting the message consisting of the data part and the control part through a physical channel.

Meanwhile, in transmission of the PCPCH, the mobile station uses a code mapped one-to-one with the signature of the CA-ICH as a scrambling code, and also uses a node having a spreading factor of 2C (2.0) on an OVSF code tree against all of CA-ICHs as a channelization code.

Meanwhile, the signatures of the AP are one-to-one mapped with the channelization codes of the message part. That is, as shown in FIG. 3, if the minimum spreading factor $SF_{min}$ of the data part is 32, in the OVSF code tree, the AP selects one of codes having spreading factors of 32~256 in an up branch direction from the node having a spreading factor of 16 as a channelization code $C_d$ of the data part to map therewith. It also selects a code located last in a down branch, i.e., a code having a spreading factor of 256, as a channelization code $C_c$ to map therewith. A gold code, a M-sequence code, and a Kasami code may be used as a scrambling code of the message part.

Therefore, when the base station receives the message part mapped as above, the base station decodes the control part using the channelization code Cc determined by the AP signature. Since the data part corresponds to one of spreading factors 32~256, the base station partially codes an OVSF code having a spreading factor of 16 and then decodes the control part. The base station detects an exact spreading factor of the data part to decode the data part.

Meanwhile, if the spreading factor serviced by the cell is below 16, i.e., if the minimum spreading factor $SF_{min}$ is 4, 8, and 16, the AP signature is not mapped with the channelization code of the message part one to one. Accordingly, as shown in FIG. 4, a fixed channel structure is used.

FIG. 4 shows a mapping structure between the AP signature and the CPCH when a related art spreading factor is 4. Referring to FIG. 4, if the minimum spreading factor SFmin of the CPCH serviced by the cell is 4, 8, and 16, a specific AP is fixed to indicate a specific channel.

That is, AP#0~AP#7 of the 16 APs indicate CH#0, AP#8~AP#9 indicate CH#1, AP#10~AP#11 indicate CH#2, and AP#12~AP#15 respectively indicate CH#3~CH#6. At this time, in CH#0~CH#2, the channelization code $C_d$ of the data part is determined as one of codes of the next node as shown in FIG. 5. The channelization code $C_c$ of the control part is determined as a code located last in a down branch direction, i.e., a code having a spreading factor of 256. At this time, since the minimum spreading factor $SF_{min}$ is below 32 in CH#3~CH#6, partial coding is performed with a spreading factor of 16 as described above. In this fixed channel structure, CSICH denotes a status of CH#0~CH#6.

Accordingly, when a specific mobile station desires to transmit data having a spreading factor of 4, one of AP#0~AP#7 corresponding to CH#0 is selected as the signature of the AP. When a specific mobile station desires to transmit data having a spreading factor below 32, one of AP#12~AP#15 is selected.

The aforementioned related art has several problems. For example, since 16 signatures of the CA-ICH are used in the related art CPCH, PCPCHs more than 16 cannot be allocated with the CA-ICH. In this case, when considering that the next generation mobile communication system should support 64 maximum PCPCHs per one cell for low rate data service, a method for allocating a CPCH is required to more efficiently use a channel resource.

Additionally, in the related art method for allocating a CPCH, a mapping method between a signature of the CA-ICH for channel allocation and an OVSF code that is a channelization code of the CPCH, has not been suggested. Accordingly, the channel resource is not efficiently used. For this reason, a mapping method between the signature of the CA-ICH and the OVSF code is required.

Further, in the related art transmission structure of a CPCH, particularly, in case of AP, the CPCH has a data rate of 960~15 kbps and thus a spreading factor is variable at 4~256. In this respect, there are several problems.

For example, the signature of the AP in access step of the mobile station is mapped with 16 nodes having a spreading factor of 16 on the OVSF code tree. Accordingly, transmitting data having a spreading factor below 32 can be accomplished. However, in transmitting data having a spreading factor of 4, 8 and 16, one-to-one mapping between the signature of the AP and the node is not performed. In this case, a fixed channel structure is required. Accordingly, to use a data rate of 4 in the fixed channel structure, the specific mobile station should select one of 8 signatures, as opposed to 16 signatures. This increases the probability of collision of the CPCH in the access step. At this time, if data having a spreading factor of 32 or less is transmitted, as shown in FIG. 4, the AP of one of AP#12~AP#15 should be selected. This also results in that the probability of collision of the CPCH increases in the access step.

Next, if the specific mobile station uses CH#0 having a spreading factor of 4, AP#4~AP#6 can be used for data transmission having a spreading factor of 32 or less. However, in the fixed channel structure, the APs remain vacant. This causes a problem that the channel resource is inefficiently used.

Moreover, since different spreading factors are supported to the respective AP signatures, a separate mapping table between the AP signature and the spreading factor is required. Also, since the system should periodically broadcast the mapping table information to the mobile station through a broadcasting channel BCH, problems arise in that the capacity of the system increases and interference increases.

The above references are incorporated by reference herein where appropriate for appropriate teachings of additional or alternative details, features and/or technical background.

SUMMARY OF THE INVENTION

An object of the present invention is to provide a method for allocating CPCHs in a mobile communication system that substantially obviates one or more of the problems due to limitations and disadvantages of the related art.

Another object of the present invention is to provide a method for allocating CPCHs in a mobile communication system, in which a channel resource can be efficiently used.

Another object of the present invention is to provide a method for allocating CPCHs in a mobile communication system, in which variable spreading factors can be served.

Another object of the present invention is to provide a method for allocating CPCHs in a mobile communication system which can support 16 or more CPCHs for low data rate service in a base station.

To achieve at least these advantages in whole or in parts, there is provided a set of scrambling codes used for the PCPCH message part that have one-to-one correspondence to the signature sequences and the access sub-channels used by the access preamble part. Both long or short scrambling codes can be used to scramble the CPCH message part.

To further achieve at least these advantages, in whole or in parts, there is provided a method for allocating CPCHs in a next generation mobile communication system including the steps of transmitting status information of the CPCHs from a system to a mobile station, mapping a signature for indicating a specific CPCH to be used in accordance with the status information with a scrambling code, and transmitting an AP with the signature to the system to request allocation of the CPCH.

The mobile station can preferably map respective signatures of the CPCHs that can be serviced by the system with different scrambling codes. Also, the mobile station divides a specific scrambling code into chip codes of a predetermined length, and the signatures of the CPCHs can be mapped with the divided scrambling chip codes.

To further achieve at least these objects in whole or in parts, there is provided a mobile station that receives status information of a CPCH from a system, and tries to access the system for use of the CPCH in accordance with the received status information. The system then maps signatures of a CA-ICH for the CPCH to be allocated with scrambling codes, and the mobile station transmits a message to a corresponding physical channel in accordance with the CA-ICH.

The mobile station can preferably map respective signatures of the CA-ICH with different scrambling codes for the CPCH to be allocated. Also, the system divides a specific scrambling code into chip codes of a predetermined length, and the respective signatures of the CA-ICH can be mapped with the divided scrambling chip codes.

The mobile station can preferably select one of codes located in an up branch from a node having a spreading factor of 2 in a code tree of the scrambling codes as a channelization code of a data part and can select a code last located in a down branch as a channelization code of a control part. Also, the mobile station can select a code last located among codes in an up branch from a node having a spreading factor of 2 as a channelization code of the control part, and can select one of codes in an up branch among branches of a code located in a lower code of the node as a channelization code of the data part.

To further achieve the above described objects, in whole or in parts, there is provided a method for allocating CPCHs including the steps of transmitting a maximum data rate and a minimum spreading factor of a desired channel from a mobile station to a system to request allocation of the channel, determining at the system whether allocation of the requested channel is available and responding to the mobile station, mapping a CD-P for preventing channel collision with a specific scrambling code set and transmitting the CD-P from the mobile station to the system, selecting at the system a scrambling code from the scrambling code set designated by the transmitted CD-P, mapping the selected scrambling code with a CA-ICH, and transmitting a message from the mobile station to the system using a scrambling code designated by the transmitted CA-ICH.

When transmitting the CD-P, one signature of the CD-P is mapped with one scrambling code set one to one in accordance with the number of available scrambling code sets, or a plurality of signatures are mapped to indicate a specific scrambling code set.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

There are preferably 64 uplink scrambling codes defined per cell and 32768 different PCPCH scrambling codes defined in the system.

The n:th PCPCH message part scrambling code, denoted $S_{c\text{-}msg,n}$, where n=8192,8193, . . . ,40959 is based on the scrambling sequence and is defined as follows.

In the case when the long scrambling codes are used:

$S_{c\text{-}msg,n(i)} = C_{long,n(i)}$, i=0, 1, $P_tP_tP_t$, 38399 where the lowest index corresponds to the chip transmitted first in time and $C_{long,n}$ is defined in section 4.3.2.2.

In the case the short scrambling codes are used:

$S_{c\text{-}msg,n(i)} = C_{short,n(i)}$, i=0, 1, $P_tP_tP_t$, 38399

The 32768 PCPCH scrambling codes are divided into 512 groups with 64 codes in each group. There is a one-to-one correspondence between the group of PCPCH preamble scrambling codes in a cell and the primary scrambling code used in the downlink of the cell. The k:th PCPCH scrambling code within the cell with downlink primary scrambling code m, k=16,17,$P_tP_tP_t$, 79 and m=0, 1, 2, $P_tP_tP_t$, 511, is $S_{c\text{-}msg}$, n as defined above with n=64×m+k+8176.

First Embodiment

In the first preferred embodiment of the present invention, a channel resource is efficiently used, and a mapping method between AP signatures and a CPCH is able to serve all data rates.

To this end, AP signatures are mapped with scrambling codes of a message part, and three types of mapping methods are presented. Also, two methods for selecting data of a message part and a channelization code of a control part are available when the AP signatures are mapped with the scrambling codes.

First Mapping Method

Figure 1:
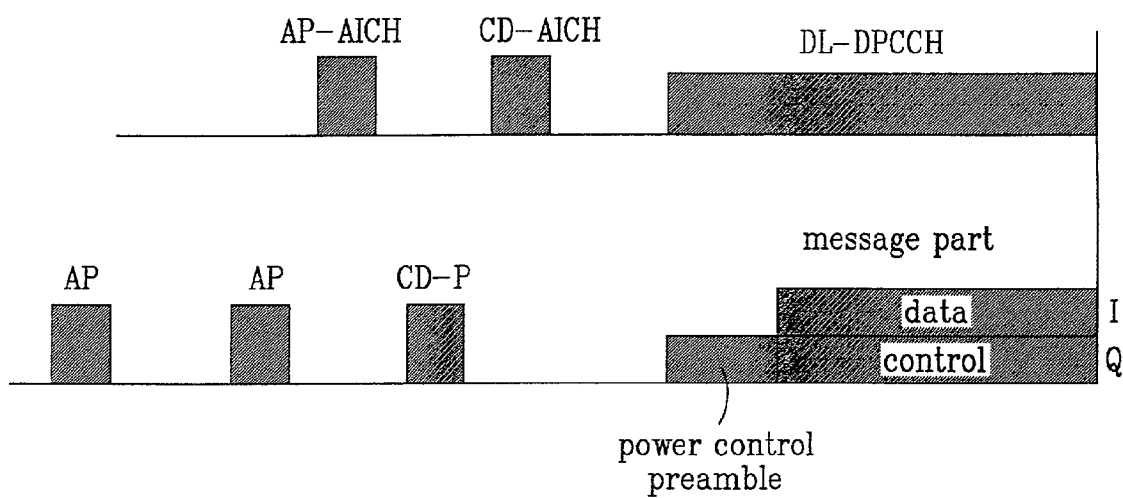
FIG. 1 is a drawing illustrating a related art transmission structure of a CPCH.
Figure 2:
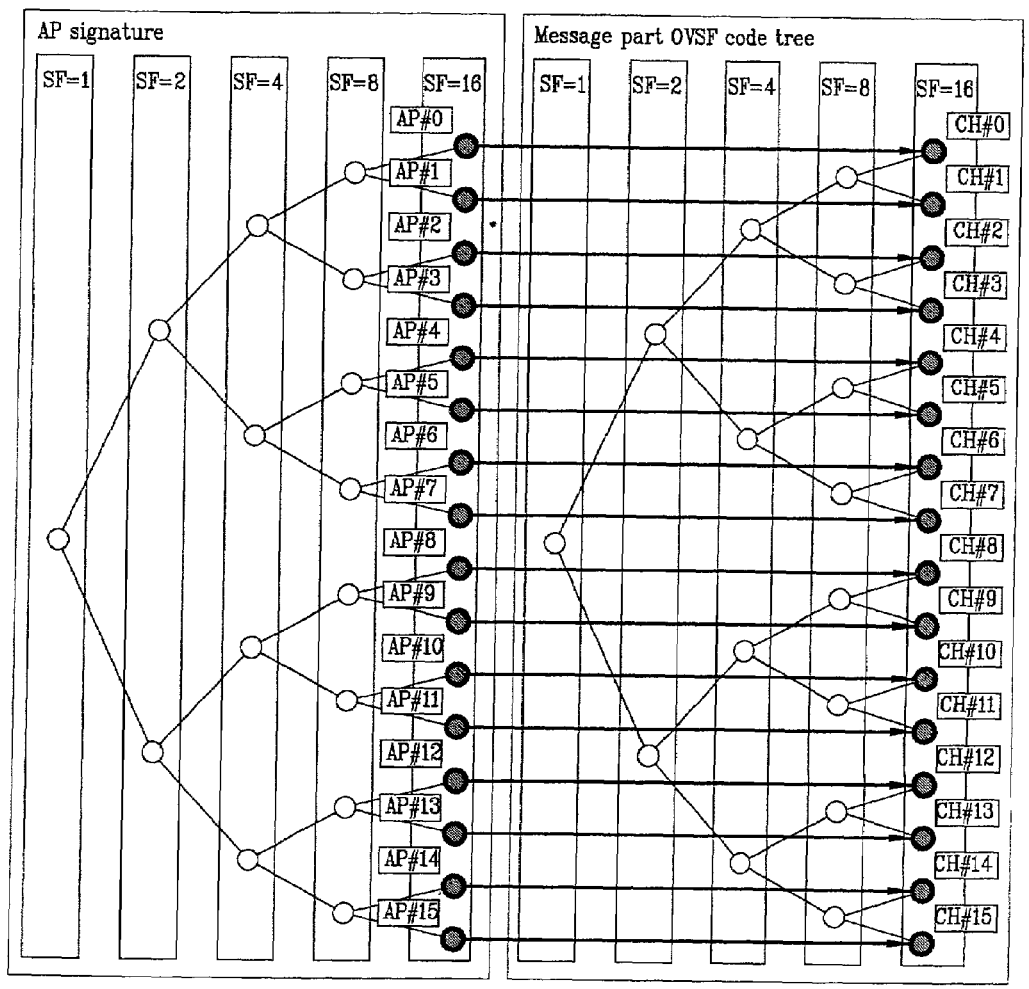
FIG. 2 is a drawing illustrating a related art mapping structure between AP signatures and the CPCH when a spreading factor is 16.
Figure 3:
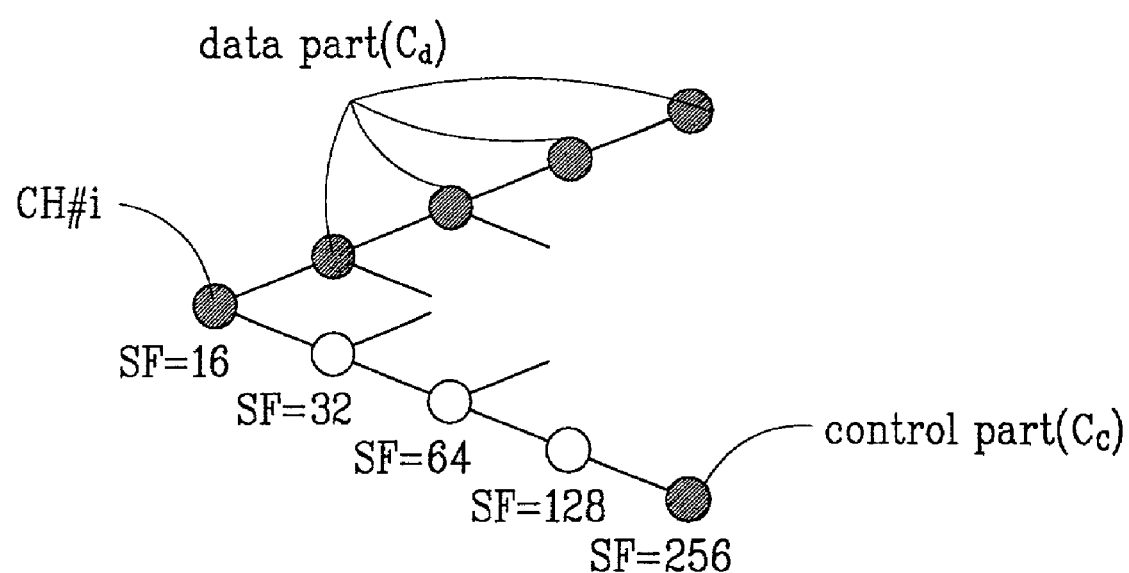
FIG. 3 is a drawing illustrating a related art method for determining a channelization code of a message part of the CPCH when a spreading factor is 32.
Figure 4:
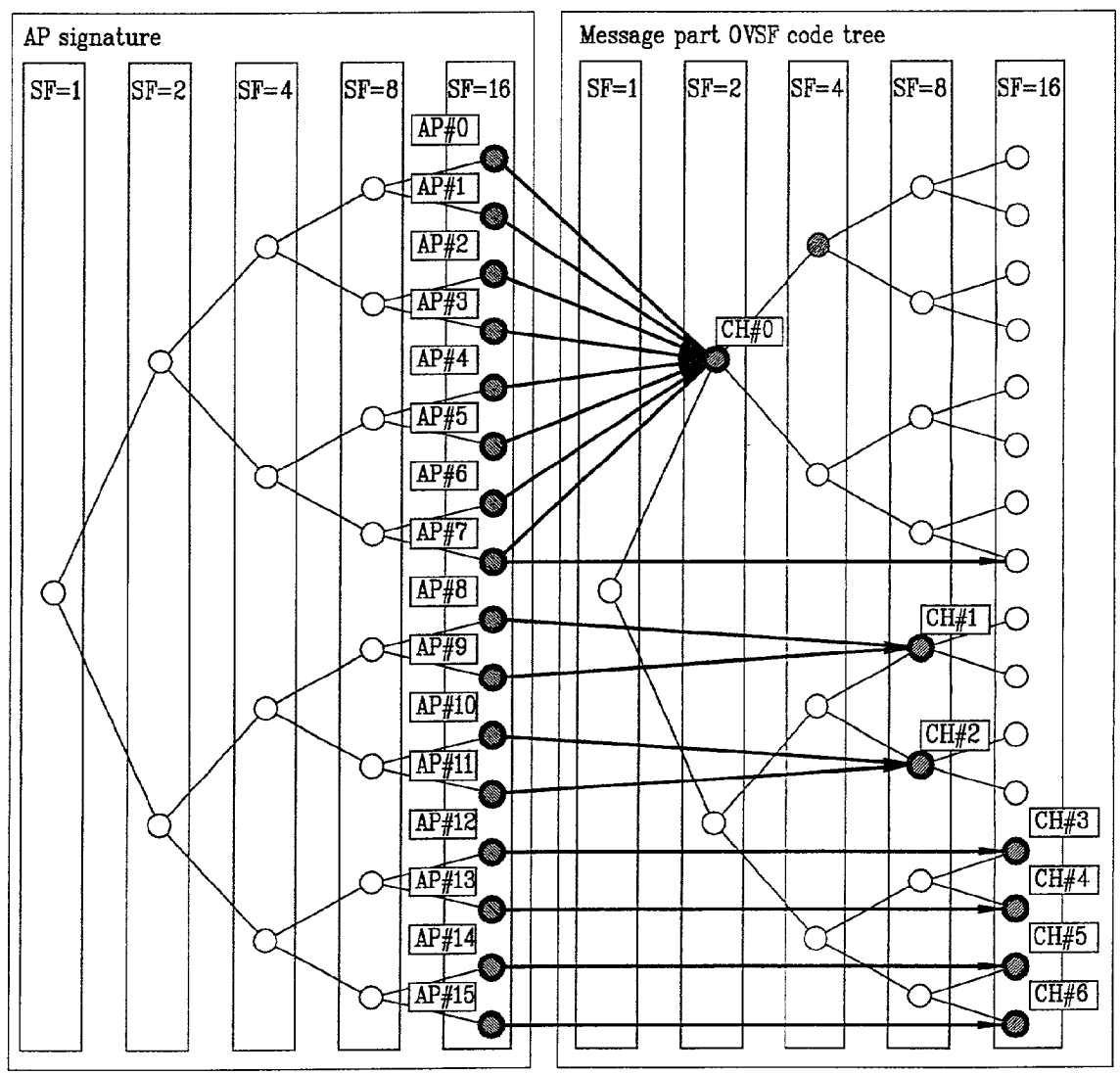
FIG. 4 is a drawing illustrating a related art mapping structure between AP signatures and the CPCH when a spreading factor is 4.
Figure 5:
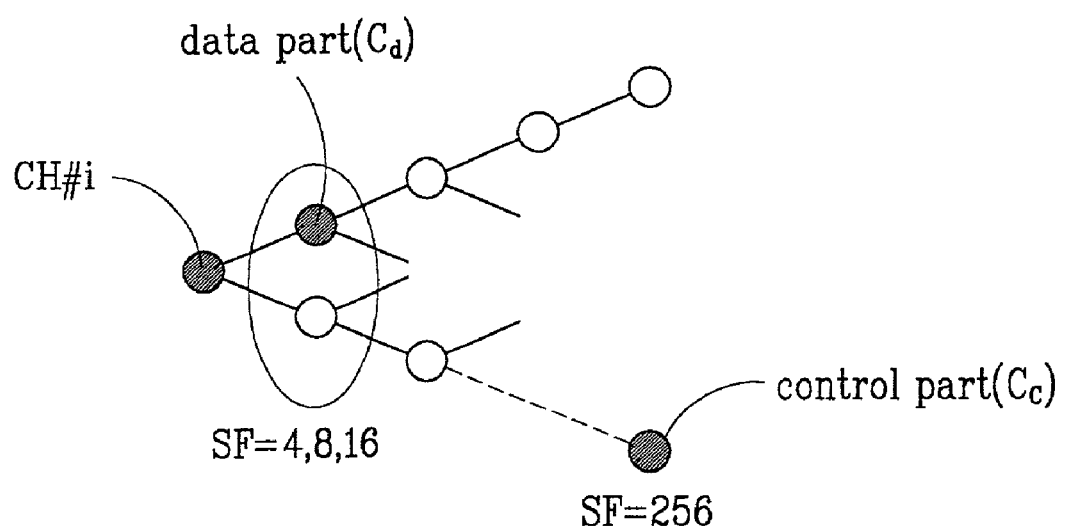
FIG. 5 is a drawing illustrating a related art method for determining a channelization code of a message part of the CPCH when a spreading factor is 4, 8, and 16.
Figure 6:
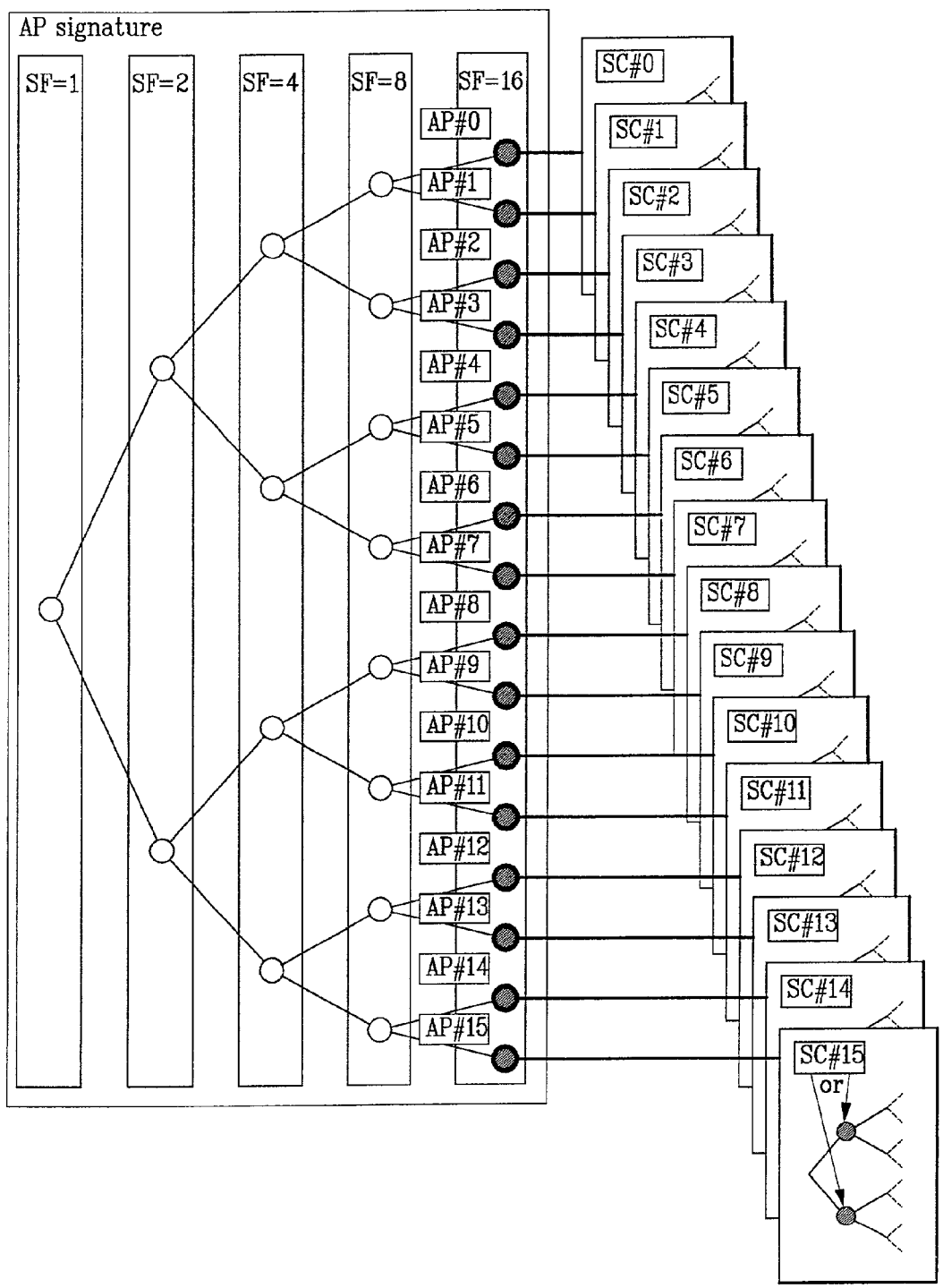
FIG. 6 is a drawing illustrating an example of a mapping structure between AP signatures and scrambling codes according to the first embodiment of the present invention.

FIG. 6 shows an example of a mapping structure between AP signatures and scrambling codes according to the first mapping method of the first preferred embodiment. In the first mapping method, individual scrambling codes SC#i are mapped with each AP signature AP#i.

Referring to FIG. 6, 16 AP signatures are one-to-one mapped to different scrambling codes. That is, AP signatures of AP#0~AP#15 are mapped to indicate scrambling codes SC#0~SC#15 of the message part. At this time, since the scrambling codes SC#0~SC#15 are each different scrambling codes, 16 scrambling codes are required according to this embodiment. However, the number of the scrambling codes is $2^{25}$, so there is no deficiency of the codes.

As described above, if AP signatures are mapped with the scrambling codes, each of the 16 scrambling codes are different from one another. The respective scrambling codes SC#i have a channelization OVSF code tree. Accordingly, the channelization code of a data part ($C_d$) and a control part ($C_c$) in a message part is selected in the channelization OVSF code tree of the respective scrambling code.

Figure 7A:
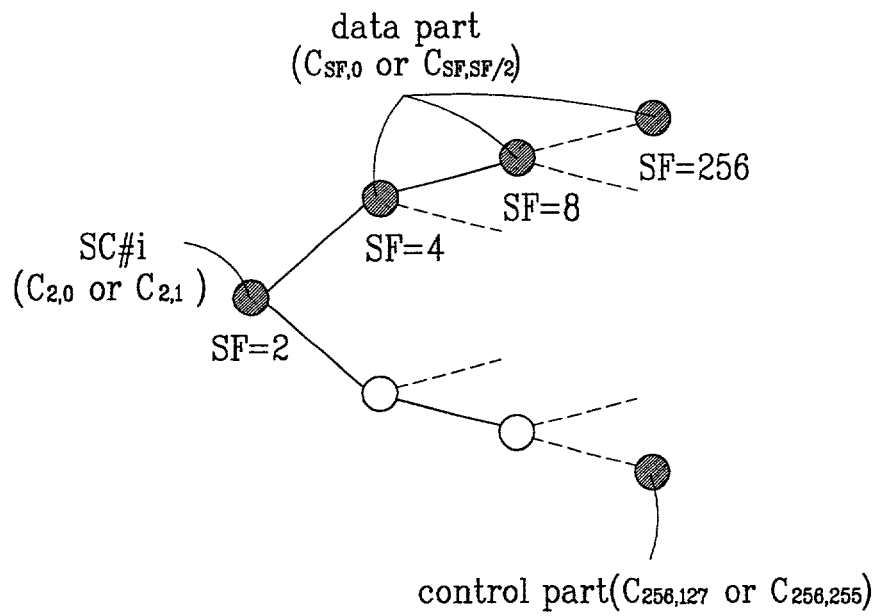
FIGS. 7a and 7b are drawings illustrating a method for determining a channelization code of a message part of the CPCH according to the first embodiment of the present invention.
Figure 7B:
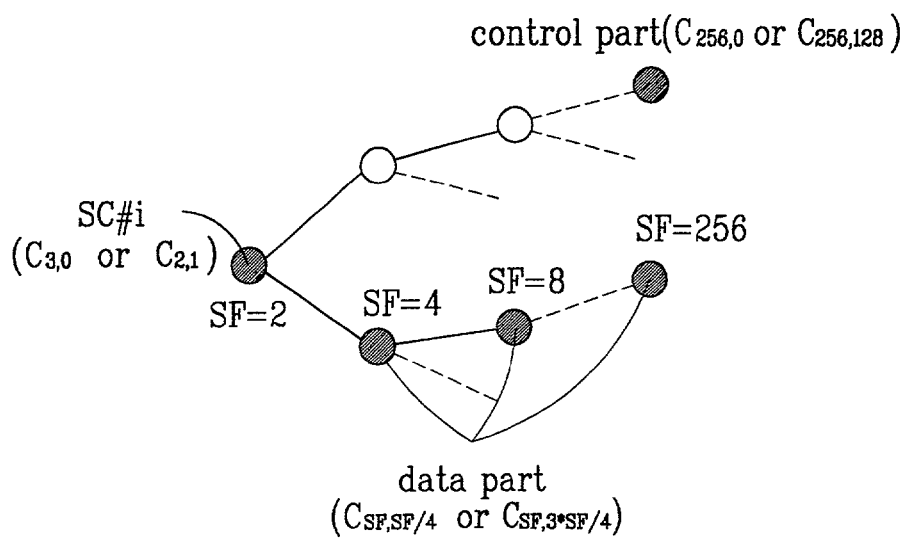

As shown in FIGS. 7a and 7b, two methods are provided for selecting the channelization code according to the first embodiment.

Referring to FIG. 7a, in an OVSF code tree of each scrambling code, a channelization code $C_d$ of the data part is selected from the codes having spreading factors 4~256 in a direction of an up branch $C_{SF,0}$ or $C_{SF,SF/2}$ from a node $C_{2,0}$ or $C_{2,1}$ having a spreading factor of 2. Additionally, a code $C_{256,127}$ or $C_{256,255}$, which is located last in a direction of a down branch, i.e., a code having a spreading factor of 256, is selected as a channelization code $C_c$ of the control part. The (n)th channelization code with a spreading factor SF can also be written $C_{ch,SF,n}$.

Referring to FIG. 7b, a code $C_{256,0}$ or $C_{256,128}$, which is located last in a direction of an up branch from a node having a spreading factor of 2 is selected as a channelization code $C_c$ of the control part. Additionally, a lower node of two nodes having a spreading factor of 4 generated from a node having a spreading factor of 2 is selected and one of codes having spreading factors 4~256 in a direction of an up branch $C_{SF,SF/4}$, $C_{SF,3*SF/4}$ of the selected node is selected as a channelization code $C_d$ of the data part.

Second Mapping Method

Figure 8:
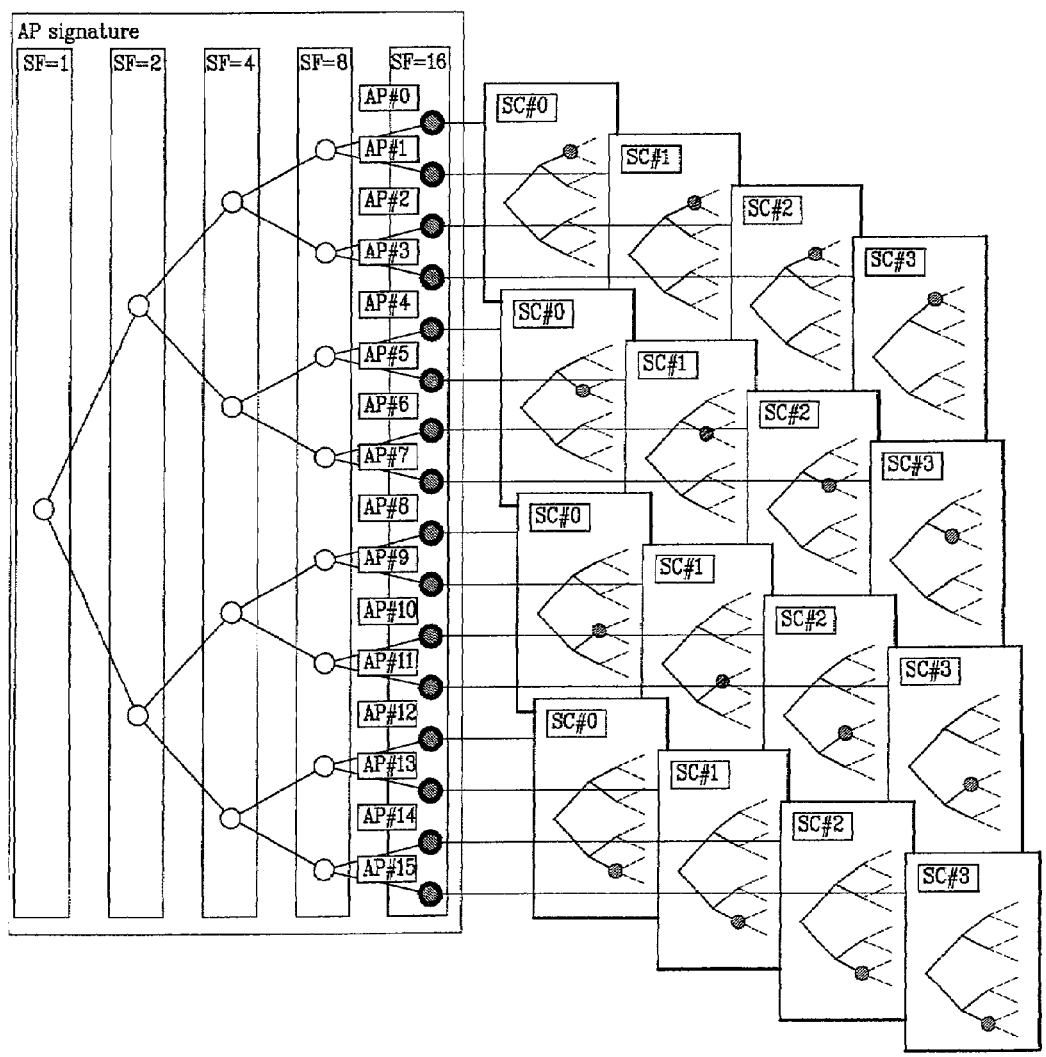
FIG. 8 is a drawing illustrating another example of a mapping structure between AP signatures and scrambling codes according to the first embodiment of the present invention.

FIG. 8 shows an example of a mapping structure between AP signatures and scrambling codes according to the second mapping method of the first preferred embodiment.

In the second mapping method, different AP signatures use one scrambling code in common. Particularly, the second mapping method considers a minimum spreading factor $SF_{min}$ of a CPCH that can be serviced by a cell. In FIG. 8, it is assumed that the minimum spreading factor $SF_{min}$ is 8.

Referring to FIG. 8, in the second mapping method, the number of scrambling codes mapped with the AP signatures is determined according to the minimum spreading factor $SF_{min}$ that can be serviced by the cell. That is, the number of the scrambling codes is determined by the following equation (1):

$$\text{The number of scrambling codes} = \frac{32}{SF_{min}} \quad (1)$$

In more detail, one OVSF code tree has two nodes having a spreading factor of 2. That is, the nodes are $C_{2,0}$ and $C_{2,1}$. Therefore, considering that the spreading factors used in the CPCH are 4~256, two scrambling codes can use one OVSF code tree in common.

For example, if AP#0~AP#7 are mapped to indicate the node $C_{2,0}$ of SC#0~SC#7, and AP#8~AP#15 are mapped to indicate the node $C_{2,1}$, 16 AP signatures can respectively be mapped with total 8 scrambling codes.

Therefore, if the minimum spreading factor $SF_{min}$ supported by the cell is greater than 4, the scrambling codes smaller than 8 can be used in accordance with the minimum spreading factor $SF_{min}$.

In FIG. 8, since the minimum spreading factor $SF_{min}$ is 8, the number of the required scrambling codes is 4, as shown in equation (1). Accordingly, in FIG. 8, 16 AP signatures are mapped with 4 scrambling codes.

Since the number of nodes having a spreading factor of 4 in divided scrambling codes SC#0, SC#1, SC#2, and SC#3 is 4, AP#0, AP#4, AP#8, and AP#12 are mapped with each node of SC#0. Similarly, AP#1, AP#5, AP#9, and AP#13 are mapped with each node of SC#1, AP#2, AP#6, AP#10, and AP#14 are mapped with each node of SC#2, and AP#3, AP#7, AP#11, and AP#15 are mapped with each node of SC#3.

In this way, if the minimum spreading factor $SF_{min}$ is 16, two scrambling codes are used, by applying equation 1. 16 AP signatures are respectively mapped with 8 nodes having a spreading factor of 8 in two scrambling codes as described above.

Finally, if the minimum spreading factor $SF_{min}$ is 32, only one scrambling code is only used.

In the aforementioned second mapping method, the channelization code of the message part can be selected in accordance with two methods described in the first mapping method.

Third Mapping Method

Figure 9:
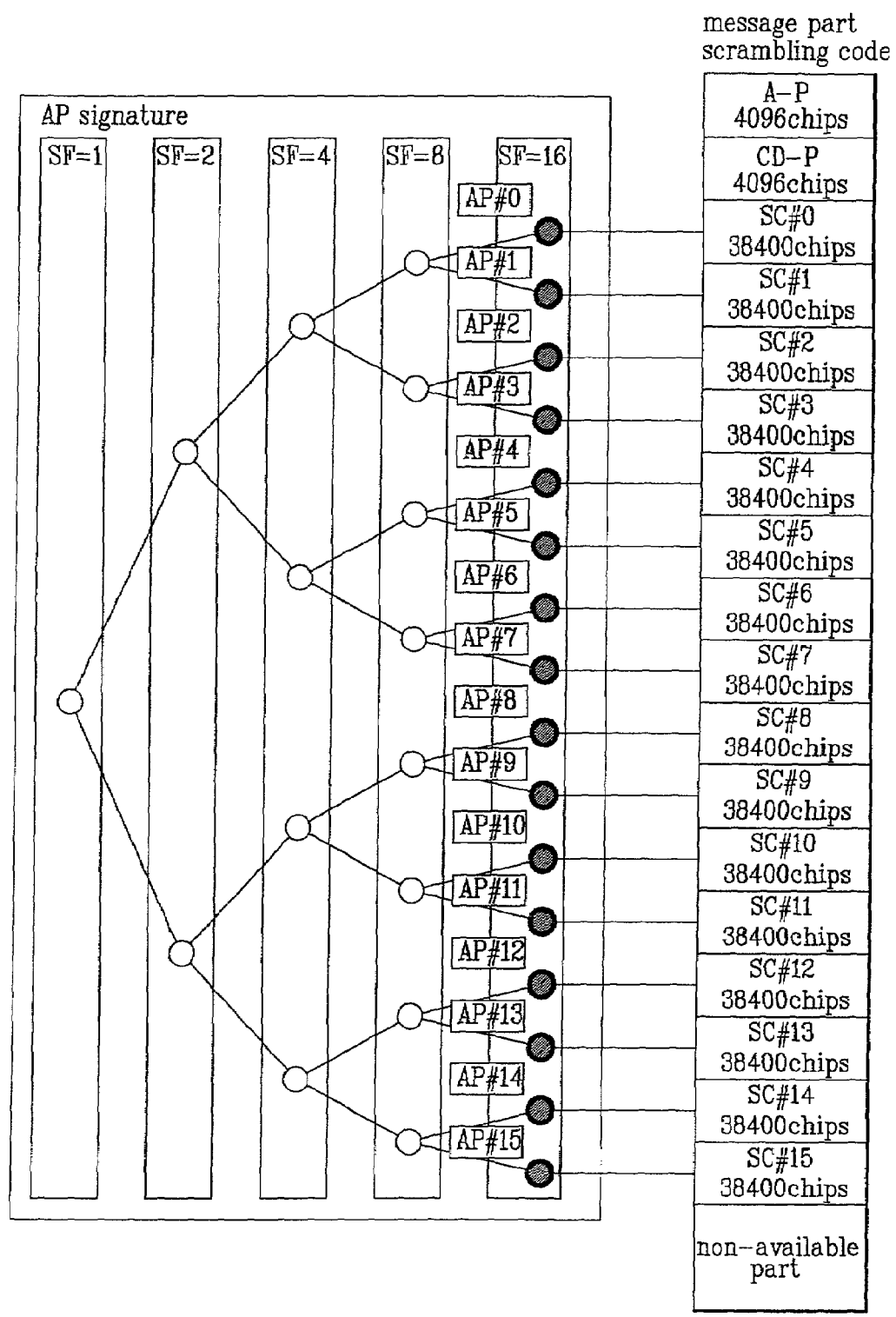
FIG. 9 is a drawing illustrating other example of a mapping structure between AP signatures and scrambling codes according to the first embodiment of the present invention.

FIG. 9 shows an example of a mapping structure between AP signatures and scrambling codes according to the third mapping method of the first preferred embodiment.

In the third mapping method, one scrambling code is divided into a plurality of chip codes to map with each AP signature.

Referring to FIG. 9, each scrambling code used in an uplink in a wide band code division multiple access communication system is a long code and has $2^{25}$-1 chip codes. Each scrambling code thus has a chip length of $2^{25}$-1=33554431.

However, since the message part of the CPCH has a length of 38400 N, only 38400 chips are required as a scrambling code of the message part. Thus, one scrambling code is divided into a number of codes.

At this time, the divided scrambling codes are different from each other, and the same result as the first mapping method for allocating different scrambling codes occurs.

Since the message part has 4096 chips in an AP portion a CD-P portion, one scrambling code divides a portion other than the AP portion and the CD-P portion into codes having 38400 chips. The divided scrambling codes are mapped with each AP signature. Accordingly, the 16 AP signatures can sufficiently be mapped with one scrambling code.

Also, if one scrambling code is divided into codes having 38400 chips, the divided chip scrambling codes SC#i respectively have an OVSF code tree. Accordingly, the number of codes mapped with the AP signatures can be controlled depending on the minimum spreading factor $SF_{min}$ within the cell in the same manner as the second mapping method. That is, if the minimum spreading factor $SF_{min}$ is 8, then 4 chip scrambling codes among the divided chip scrambling codes are mapped with the 16 AP signatures.

In the aforementioned third mapping method, the channelization code of the message part is selected by the two methods described in the first mapping method.

A transmission structure of the CPCH to which the mapping methods according to the first embodiment are applied will next be described.

A mobile station which desires to transmit packet data identifies a currently available (or non-available) channel referring to a CSICH broadcasting from a base station, and tries to access the base station when a CPCH that can support a desired transmission data rate is vacant.

The mobile station transmits an AP to the base station to inform a desired CPCH. The AP consists of signatures, and each signature indicates each CPCH.

Each AP signature is mapped with the scrambling codes of the message part in each CPCH. As described in the first, second, and third mapping methods, each AP signature is mapped with different scrambling codes or one scrambling code divided into codes with a predetermined chip interval. The number of the scrambling codes can then be controlled depending on the minimum spreading factor $SF_{min}$ that can be supported by the cell.

A channelization code of the message part is selected from the channelization OVSF code tree of a corresponding scrambling code by the aforementioned two methods.

Subsequently, the base station receives the AP from the mobile station to determine whether each CPCH can be used. If each CPCH can be used, the base station transmits a signature equal to the received AP to the mobile station as an ACK signal. If each CPCH cannot be used, the base station transmits an inverted signature of the received AP to the mobile station as a non-acknowledgment (NACK).

When a number of mobile stations simultaneously transmit the AP with the same signature to the base station, the base station does not identify the mobile stations from the same signature. Hence, it transmits the ACK signal to all of the mobile stations. Thus, the mobile stations that receive the ACK signal transmit a CD-P to the base station to detect collision. Any one of the 16 signatures equal to the AP is used as the CD-P. In the same manner as the AP, codes shifted as much as 4096 chips are used as the scrambling codes.

When the base station receives one CD-P, the base station determines that a collision has not occurred, and transmits the signature equal to that of the received CD-P to the mobile station through the CD-ICH. However, when the base station receives more than one CD-P, the base station determines that collision has occurred, and selects the CD-P having the highest power among the received CD-Ps to transmit the CD-ICH to the corresponding mobile station.

Afterwards, the mobile station which received the CD-ICH begins to transmit a message to the base station. The mobile station uses the scrambling codes mapped with the AP signatures to transmit the message, and selects the channelization code to be used in the data part and the control part of the message using one of the two methods shown in FIGS. 7a and 7b.

Second Embodiment

In the second preferred embodiment of the present invention, to efficiently use a channel resource, new mapping methods between CA-ICH signatures and an OVSF code are presented.

To this end, in the second preferred embodiment of the present invention, the base station maps the CA-ICH signatures with scrambling codes of the message part, and four types of mapping methods are described. Also, two methods for selecting a channelization code in a message part and a control part in the message are provided when the base station maps the signatures with the scrambling codes.

The four types of mapping methods and two methods for selecting a channelization code will be next described.

First Mapping Method

Figure 10:
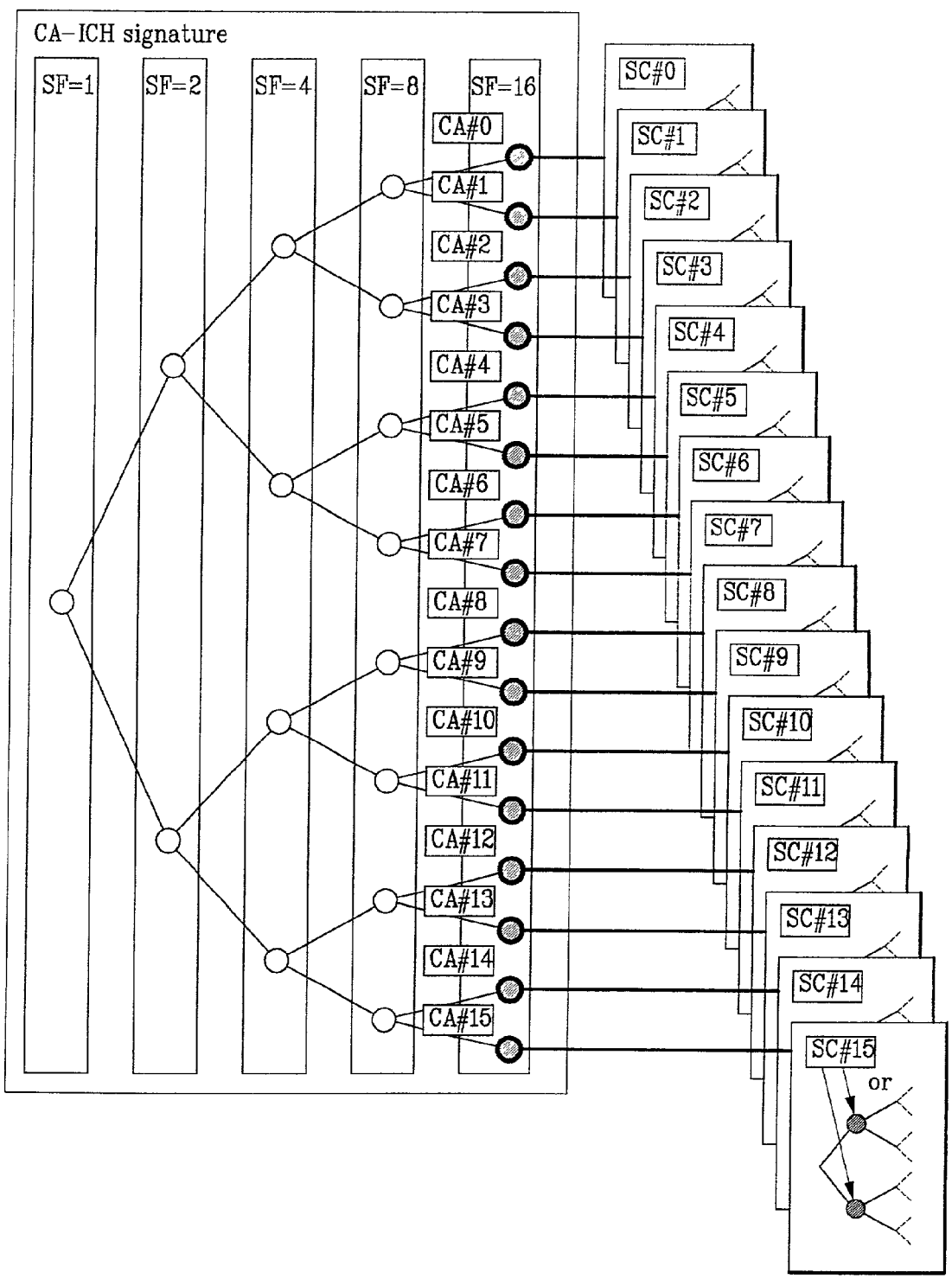
FIG. 10 is a drawing illustrating an example of a mapping structure between CA-ICH signatures and scrambling codes according to the second embodiment of the present invention.

FIG. 10 shows an example of a mapping structure between the CA-ICH signatures and scrambling codes according to the first mapping method of the second embodiment of the present invention.

In the first mapping method of the second embodiment, different scrambling codes SC#i are mapped with each of 16 CA-ICH signatures CA#i.

Referring to FIG. 10, the 16 CA-ICH signatures are mapped with different scrambling codes one to one. That is, CA-ICH signatures of CA#0~CA#15 are mapped to indicate scrambling codes SC#0~SC#15 of the message part. At this time, since the scrambling codes SC#0~SC#15 are different scrambling codes, 16 scrambling codes are additionally required. However, since the number of the scrambling codes is $2^{25}-1$, there is no deficiency of codes.

As described above, if the CA-ICH signatures are mapped with the scrambling codes, the 16 scrambling codes are different from one another. In this case, the respective scrambling codes SC#i respectively have a channelization OVSF code tree. Accordingly, the channelization code of the data part and the control part in the message part is selected in the channelization OVSF code tree of the respective scrambling code.

Figure 11A:
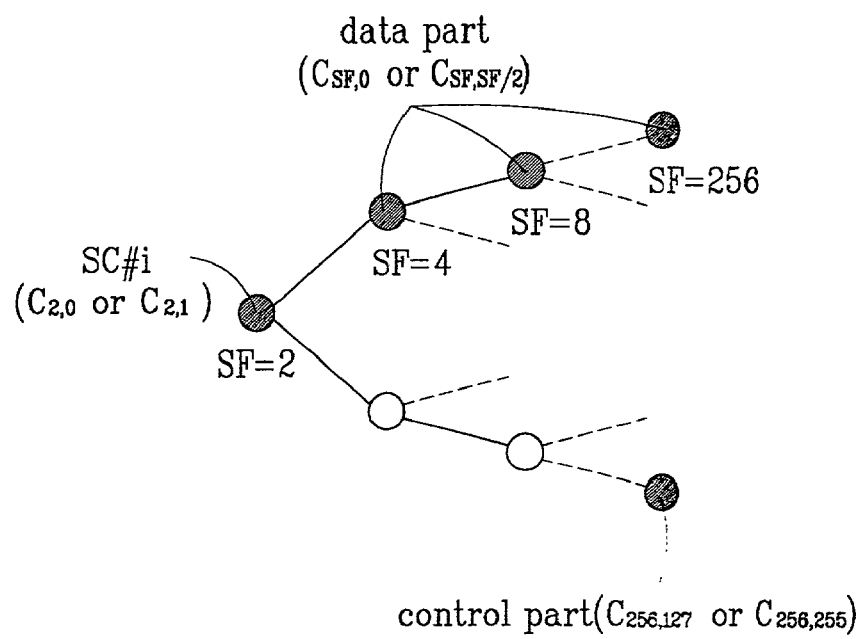
FIGS. 11a and 11b are drawings illustrating a method for determining a channelization code of a message part according to the second embodiment of the present invention.
Figure 11B:
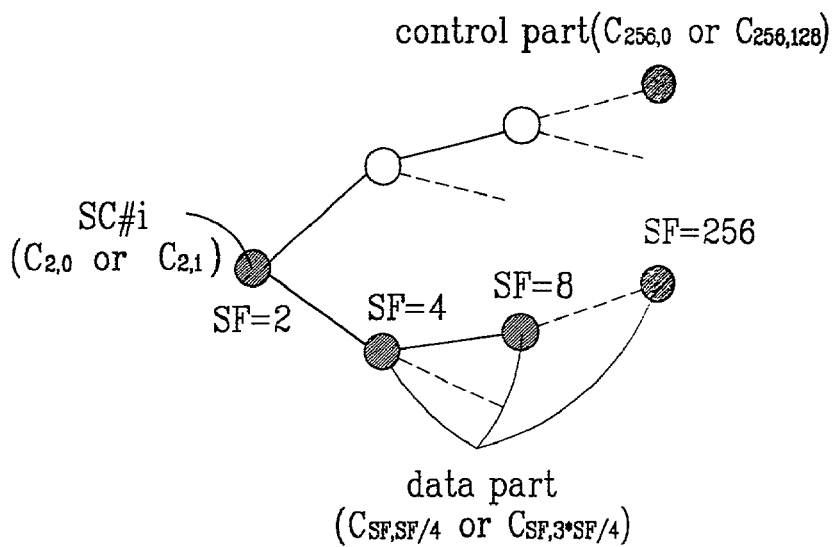

Referring to FIGS. 11a and 11b, two methods are used for selecting the channelization code. As shown in FIG. 11a, in the OVSF code tree, a channelization code $C_d$ of the data part is selected from codes having spreading factors 4~256 in a direction of an up branch $C_{SF,0}$ or $C_{SF,SF/2}$ from a node $C_{2,0}$ or $C_{2,1}$ having a spreading factor of 2. A code $C_{256,127}$ or $C_{256,255}$ located last in a direction of a down branch, i.e., a code having a spreading factor of 256, is selected as a channelization code $C_c$ of the control part.

Referring to FIG. 11b, a code $C_{256,0}$ or $C_{256,128}$ located last in a direction of an up branch from a node having a spreading factor of 2 is selected as a channelization code $C_c$ of the control part, while a lower node of two nodes having a spreading factor of 4 generated from a node having a spreading factor of 2 is selected and one $C_{SF,SF/4}$, $C_{SF,3*SF/4}$ of codes having spreading factors 4~256 in a direction of the up branch from the selected lower node is selected as a channelization code $C_d$ of the data part.

Second Mapping Method

Figure 12:
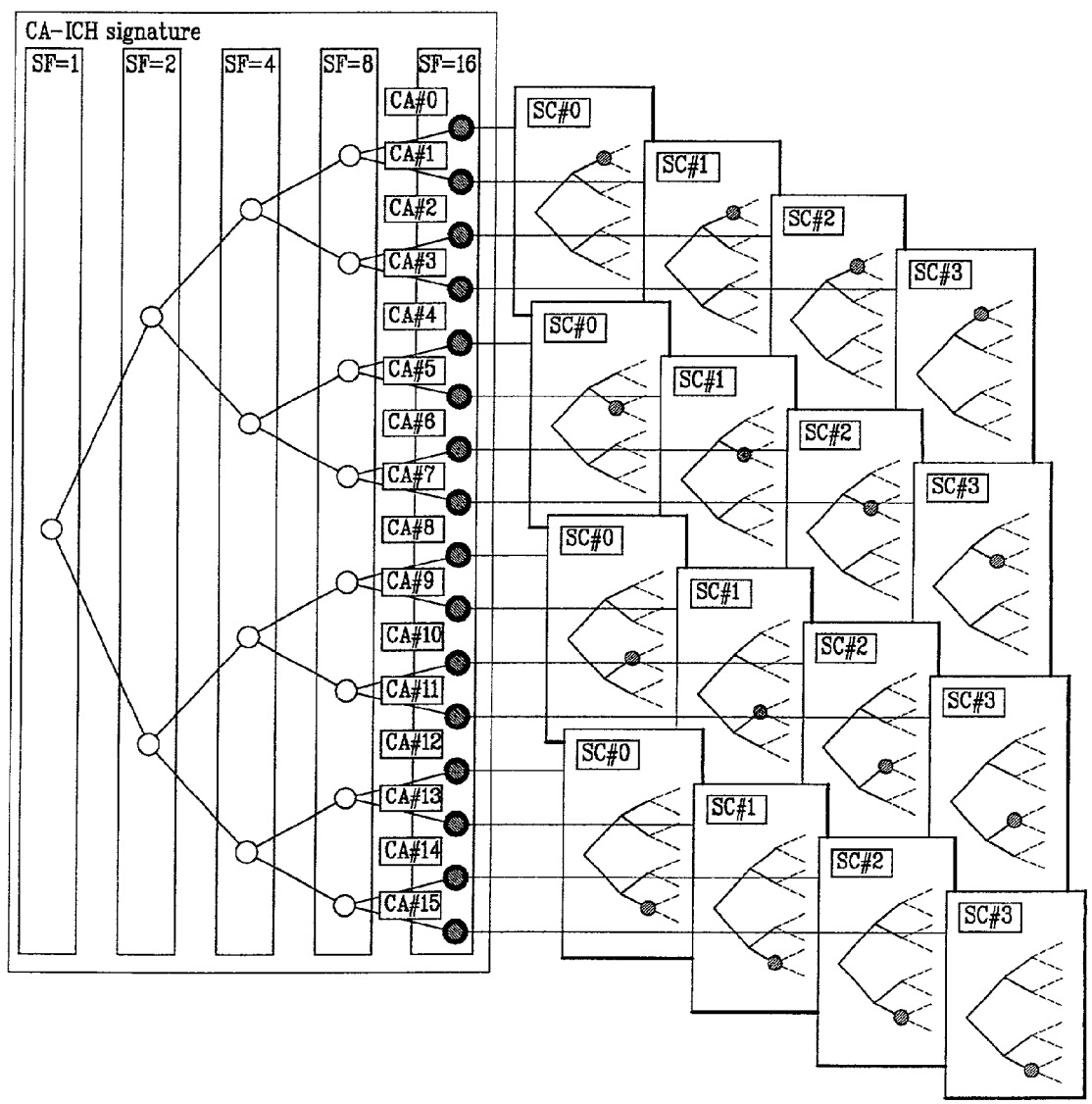
FIG. 12 is a drawing illustrating another example of a mapping structure between CA-ICH signatures and scrambling codes according to the second embodiment of the present invention.

FIG. 12 shows an example of a mapping structure between the CA-ICH signatures and scrambling codes according to the second mapping method of the second embodiment of the present invention.

In the second mapping method, the CA-ICH signatures use one scrambling code in common. Specifically, the second mapping method considers a minimum spreading factor $SF_{min}$ of a CPCH that can be serviced by a cell. In FIG. 12, it is assumed that the minimum spreading factor $SF_{min}$ is 8 for purposes of example.

Referring to FIG. 12, in the second mapping method, the number of scrambling codes mapped with the CA-ICH signatures is determined in accordance with the minimum spreading factor $SF_{min}$ that can be serviced by the cell. That is, the number of the scrambling codes is determined by the following equation (2).

$$\text{The number of scrambling codes} = \frac{32}{SF_{min}} \qquad (2)$$

In more detail, one OVSF code tree has two nodes having a spreading factor of 2. That is, the nodes are $C_{2,0}$ and $C_{2,1}$. Therefore, considering that the spreading factors used in the CPCH are 4~256, two scrambling codes can use one OVSF code tree in common.

For example, in FIG. 12, if CA#0~CA#7 are mapped to indicate the node $C_{2,0}$ of SC#0~SC#7, and CA#8~CA#15 are mapped to indicate the node $C_{2,1}$, the 16 CA-ICH signatures can respectively be mapped with total 8 scrambling codes.

Therefore, if the minimum spreading factor SFmin supported by the cell is greater than 4, scrambling codes smaller than 8 can be used in accordance with the minimum spreading factor $SF_{min}$.

In FIG. 12, since the exemplary minimum spreading factor $SF_{min}$ is 8, the number of the required scrambling codes is 4, in accordance with equation (2). Accordingly, in FIG. 12, the 16 CA-ICH signatures are mapped with 4 scrambling codes.

At this time, since the number of nodes having a spreading factor of 4 in divided scrambling codes SC#0, SC#1, SC#2, and SC#3 is 4, then CA#0, CA#4, CA#8, and CA#12 are mapped with each node of SC#0, CA#1, CA#5, CA#9, and CA#13 are mapped with each node of SC#1, CA#2, CA#6, CA#10, and CA#14 are mapped with each node of SC#2, and CA#3, CA#7, CA#11, and CA#15 are mapped with each node of SC#3.

In this way, if the minimum spreading factor $SF_{min}$ is 16, then by equation (2), two scrambling codes are used. The 16 CA-ICH signatures are respectively mapped with 8 nodes having a spreading factor of 8 in two scrambling codes as described above.

Finally, if the minimum spreading factor $SF_{min}$ is 32, only one scrambling code is only used.

In the aforementioned second mapping method, the channelization code of the message part can be selected by two methods described in the first mapping method.

Third Mapping Method

Figure 13:
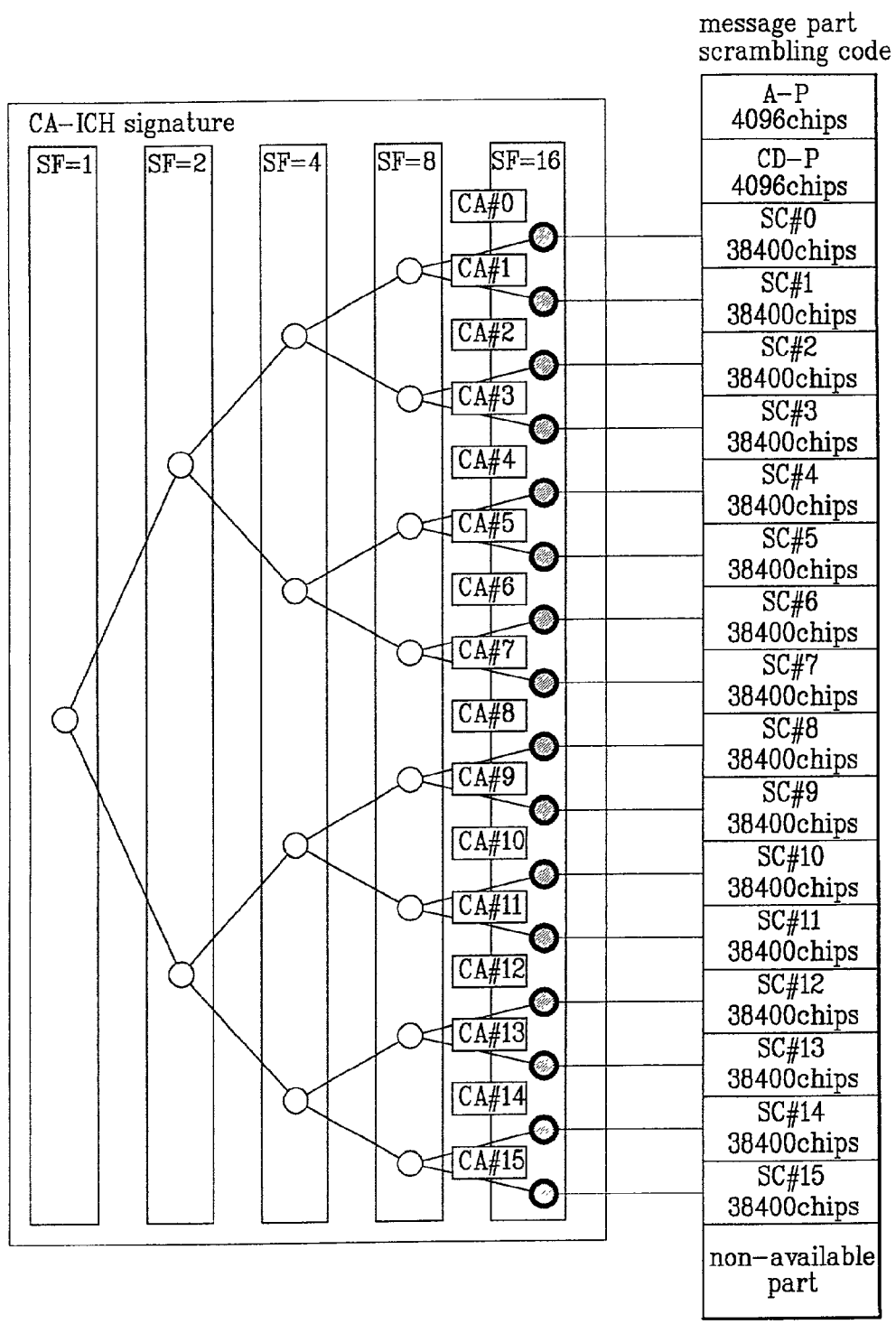
FIG. 13 is a drawing illustrating other example of a mapping structure between CA-ICH signatures and scrambling codes according to the second embodiment of the present invention.

FIG. 13 shows an example of a mapping structure between CA-ICH signatures and scrambling codes according to the third mapping method of the second embodiment of the present invention. In the third mapping method, one scrambling code is divided into a plurality of codes to map with each CA-ICH signature.

Referring to FIG. 13, each scrambling code used in an uplink of a wide band code division multiple access communication system has $2^{25}-1$ codes as long codes. Each scrambling code has a length corresponding to $2^{25}-1=33554431$ chips.

However, since the message part of the CPCH has a length of 38400 N, chips having a length of 38400 are only required as scrambling codes for the message part. Thus, one scrambling code is divided into a number of codes.

Because the divided scrambling chip codes are different from one another, the same result as the first mapping method or the second mapping method for allocating 8 different scrambling codes to the signatures occurs.

Since the message part has a chip length of 4096 in an AP portion and a CD-P portion, one scrambling code divides a portion other than the AP portion and the CD-P portion into codes having a chip length of 38400. The divided scrambling chip codes are mapped with the CA-ICH signatures. Accordingly, the 16 CA-ICH signatures can be mapped with one scrambling code only.

Also, if one scrambling code is divided into codes having 38400 chips, the divided chip scrambling codes SC#i respectively have an OVSF code tree. Accordingly, the number of codes mapped with the CA-ICH signatures can be controlled in accordance with on the minimum spreading factor $SF_{min}$ within the cell in the same manner as the second mapping method. That is, if the minimum spreading factor $SF_{min}$ is 8, then 4 chip scrambling codes among the divided chip scrambling codes are mapped with the 16 CA-ICH signatures.

In the aforementioned third mapping method, the channelization code of the message part is preferably selected by the two methods described in the first mapping method.

Fourth Mapping Method

In the fourth mapping method, when 16 or more CPCHs are allocated, a mapping method between the CA-ICH signatures and the scrambling codes is provided.

First, the base station respectively designates the CPCHs and the scrambling codes in a prescribed number of groups. Then, the base station broadcasts information of the groups to the mobile station through the CSICH.

After the mobile station acquires group information of the CPCHs through the CSICH, the mobile station contacts the base station of a group belonging to a desired CPCH through the AP. At this time, the mobile station also informs the base station of a desired maximum transmission rate through the AP.

Then, the base station maps the CA-ICH of the CPCH included in a group designated by the AP with the scrambling codes of a corresponding group and then transmits the mapped CA-ICH to the mobile station.

A mapping method between the CA-ICH and the scrambling codes is identical to the first mapping method to the third mapping method. Accordingly, one CPCH group includes 16 or 8 scrambling codes. If the number of the scrambling codes is small, one CPCH group may include scrambling codes less than 16 or 8.

As described above, when the CPCHs are designated in groups and thus the scrambling codes to be mapped with the CA-ICH signatures are divided into the groups, the AP transmitted by the mobile station designates each group as shown in Table 1 to Table 3.

TABLE 1

| AP signature numbers | CPCH groups |
|---|---|
| AP#0 ~ AP#i | SC#0 ~ SC#15 |
| AP#(i + 1) ~ AP#j | SC#16 ~ SC#31 |
| AP#(j + 1) ~ AP#15 | SC#32 ~ SC#47 |

Table 1 shows an example of when the first mapping method is applied.

In Table 1, each group includes 16 scrambling codes, and an AP of the mobile station designates one group. The CA-ICH signatures of the CPCH belonging to each group are respectively mapped with 16 scrambling codes of a corresponding group.

TABLE 2

| AP signature numbers | CPCH groups |
|---|---|
| AP#0 ~ AP#i | nodes $C_{2,0}$ and $C_{2,1}$ of SC#0 ~ SC#15 |
| AP#(i + 1) ~ AP#j | nodes $C_{2,0}$ and $C_{2,1}$ of SC#8 ~ SC#15 |
| AP#(j + 1) ~ AP#k | nodes $C_{2,0}$ and $C_{2,1}$ of SC#16 ~ SC#23 |
| AP#(k + 1) ~ AP#15 | nodes $C_{2,0}$ and $C_{2,1}$ of SC#24 ~ SC#31 |

Table 2 shows an example of when the second mapping method is applied. In Table 2, one group includes 8 scrambling codes, and an AP of the mobile station designates one group. The CA-ICH signatures of the CPCH belonging to each group are respectively mapped with the nodes $C_{2,0}$ and $C_{2,1}$ of 8 scrambling codes of a corresponding group.

TABLE 3

| AP signature numbers | CPCH groups |
|---|---|
| AP#0 ~ AP#i | nodes $C_{2,0}$ of SC#0 ~ SC#15 |
| AP#(i + 1) ~ AP#j | nodes $C_{2,0}$ of SC#16 ~ SC#31 |
| AP#(j + 1) ~ AP#k | nodes $C_{2,0}$ of SC#0 ~ SC#15 |
| AP#(k + 1) ~ AP#15 | nodes $C_{2,0}$ of SC#16 ~ SC#31 |

Table 3 shows another example of when the second mapping method is applied. In Table 3, one group includes 16 scrambling codes, and an AP of the mobile station designates one group. The CA-ICH signatures of the CPCH belonging to each group are respectively mapped with the node $C_{2,0}$ or $C_{2,1}$ of 8 scrambling codes of a corresponding group.

In the aforementioned first to third mapping methods, the base station transmits either a maximum transmission rate of the CPCH that can be serviced through the CSICH, or an availability of each data rate.

In the fourth mapping method, however, the base station transmits group information of the CPCHs in addition to the maximum transmission rate or the availability of each data rate.

A transmission structure of the CPCH to which the mapping methods according to the second embodiment are applied will next be described.

The mobile station that desires to transmit packet data identifies a currently available (or non-available) channel referring to the CSICH broadcasting from the base station. At this time, after the mobile station identifies the available maximum transmission rate and group information of the CPCHs, the mobile station tries to access the base station when a CPCH that can support a desired transmission data rate is vacant.

The mobile station preferably selects one AP signature and one access slot among 16 AP signatures and access slots, and transmits an AP consisting of the selected AP signature and the access slot to the base station in compliance with a start point of the access slot.

As described above, the mobile station transmits the AP signature and the access slot to the base station in the access step, so as to inform the base station of a maximum data rate or a minimum spreading factor $SF_{min}$ in the message part requested for data transmission.

Afterwards, the mobile station increases transmission power to retransmit the AP in compliance with the start point of the access slot if an acquisition response of the AP is not received after a prescribed period of time. Such retransmission is repeated until a given number of attempts is reached.

The base station receives the AP from the mobile station to determine a maximum data rate or a minimum spreading factor requested by the mobile station. Then, the base station determines whether to allocate a CPCH requested by the mobile station, after considering a resource of the current CPCH and a total amount of traffic. As a result, if the CPCH can be allocated, the base station transmits the signature equal to the received AP signature as an acknowledgment (ACK) signal in compliance with the start point of the access slot. If the CPCH cannot be allocated, the base station transmits an inverted signature of the received AP signature to the mobile station as a non-acknowledgment (NACK) in compliance with the start point of the access slot.

When more than one mobile stations simultaneously transmit the AP with the same signature to the base station, the base station does not identify the mobile stations from the same signature. The base station thus transmits the ACK signal to all of the mobile stations. Thus, the mobile stations which received the ACK signal transmit a CD-P to the base station to reduce the possibility of a collision. In the same manner as the AP, any one of the 16 signatures is used as the CD-P.

If the base station receives only one CD-P, the base station determines that a collision has not occurred, and transmits the signature equal to that of the received CD-P to the mobile station through the CD-ICH. However, if the base station receives a number of CD-Ps, the base station determines that a collision has occurred, and selects the CD-P having the highest power among the received CD-Ps, and transmits the CD-ICH to the corresponding mobile station.

Furthermore, the base station transmits the CA-ICH containing CPCH information to be allocated in a signature format to a corresponding mobile station. At this time, the CA-ICH signature is mapped with the scrambling codes. A method for mapping the CA-ICH signature with the scrambling codes is performed by the aforementioned first to fourth mapping methods. The channel information contained in the CA-ICH includes a channelization code and a scrambling code of a down link-dedicated physical control channel (DL-DPCCH) and a physical common channel (PCPCH). The CD-ICH and the CA-ICH are simultaneously transmitted to the mobile station.

Afterwards, the mobile station that received the CD-ICH and the CA-ICH starts to transmit a message. The mobile station controls transmitting power using the PC-P if necessary to transmit the message. The base station transmits the DL-DPCCH to the mobile station. The mobile station transmits the message part with the physical channel allocated in accordance with the scrambling codes mapped with the CA-ICH signatures. One of the methods shown in FIGS. 11a and 11b is preferably used to select a channelization code of the data part and the control part in the message part.

Third Embodiment

In the third preferred embodiment of the present invention, a method for allocating a CPCH that can serve 16 or more CPCHs using a CD-P transmitted by the mobile station to detect and solve collision and a CA-ICH transmitted by the base station to allocate channels. is provided.

In the third preferred embodiment of the present invention, the CD-P is mapped with the CA-ICH to indicate scrambling codes used to transmit the message part. Accordingly, the CD-P used in the third embodiment of the present invention serves to indicate the scrambling codes used to transmit the message part in addition to a function that detects and solves collisions of the channels.

Two mapping methods in the third embodiment of the present invention will be discussed.

First Mapping Method

Figure 14:
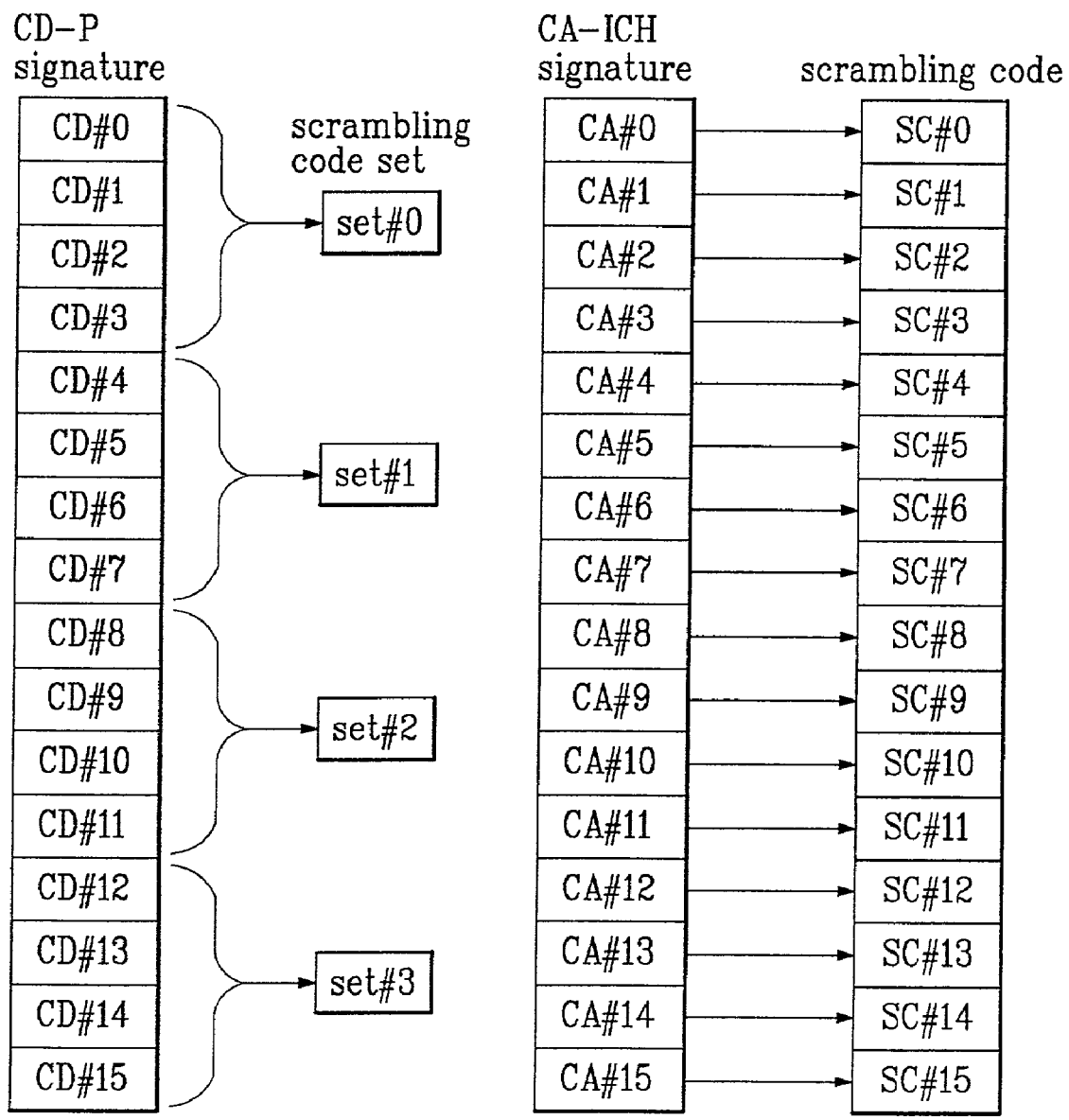
FIG. 14 is a drawing illustrating an example of a mapping method between a CD-P and a CA-ICH according to the third embodiment of the present invention.

FIG. 14 shows an example of a first mapping method between a CD-P and a CA-ICH according to the third embodiment of the present invention.

Referring to FIG. 14, in the first mapping method of the third embodiment, the mobile station indicates a scrambling code set Set#j through the CD-P, and indicates a scrambling code SC#K through the CA-ICH.

First, the mobile station selects one of 16 signatures CD#0~CD#15 to detect a collision of channels, and transmits a CD-P with the selected signature to the base station.

At this time, the mobile station performs mapping so that the selected signature indicates a specific scrambling code set Set#j.

If the number of the scrambling code sets available in one cell is, for example, 4, then CD#0~CD#3 are mapped to indicate a scrambling code set Set#1, CD#8~CD#11 are mapped to indicate a scrambling code set Set#2, and CD12~CD#15 are mapped to indicate a scrambling code set Set#3. In this case, if the number of the scrambling code sets available in the cell is 16, 16 signatures are respectively mapped with 16 different scrambling code sets one to one.

As described above, the mobile station transmits the CD-P mapped to indicate a specific scrambling code set to the base station. The base station then transmits the ACK signal to the mobile station through the CD-ICH if it is determined that no channel collision exists in the received CD-P, and an available PCPCH exists therein. At the same time, the base station transmits the CA-ICH to the mobile station.

The base station selects one SC#k from a specific scrambling code set Set#j designated by the CD-P and maps the CA-ICH signatures with the selected scrambling code SC#k so that the CA-ICH indicates the selected scrambling code SC#k. That is, since one scrambling code set Set#j includes 16 scrambling codes, 16 signatures of the CA-ICH are respectively mapped to indicate one scrambling code.

Afterwards, the mobile station which received the CD-ICH and the CA-ICH detects scrambling codes required to transmit the message through the CA-ICH and uses them when transmitting the message part.

Meanwhile, if the CPCHs are allocated by the above mapping method, it is possible to support 64 CPCHs when the number of scrambling code sets available in the cell is 4 while it is possible to support 256 CPCHs when the number of scrambling code sets is 16.

Second Mapping Method

Figure 15:
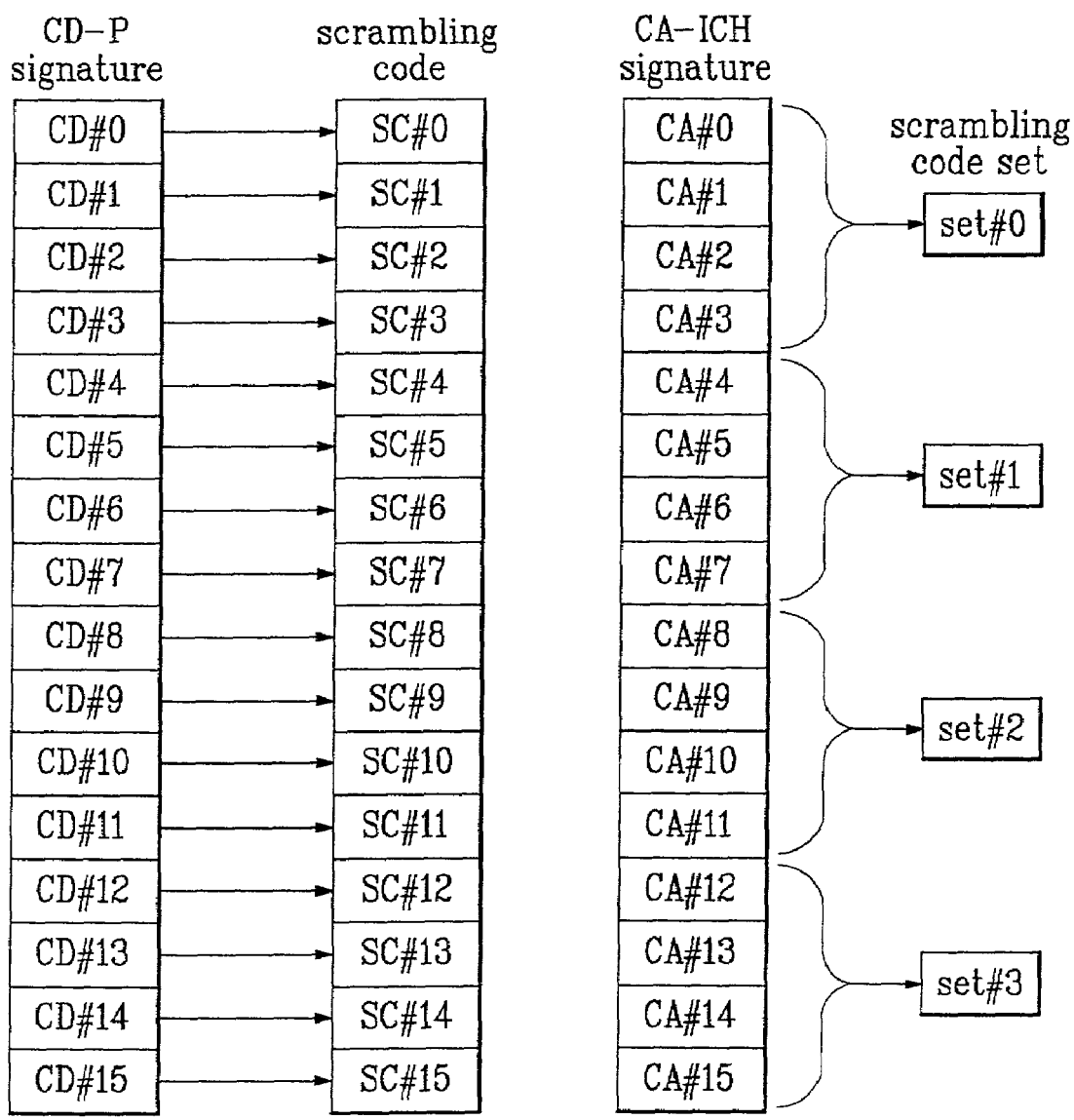
FIG. 15 is a drawing illustrating another example of a mapping method between a CD-P and a CA-ICH according another embodiment of the present invention.

FIG. 15 shows another example of a mapping method between a CD-P and a CA-ICH according to the third preferred embodiment of the present invention.

Referring to FIG. 15, the mobile station indicates a scrambling code SC#k through the CD-P and indicates a scrambling code set Set#j through the CA-ICH.

First, the mobile station selects one of 16 signatures CD#0~CD#15 to detect a collision of channels and transmits a CD-P with the selected signature to the base station. At this time, the mobile station performs a mapping function so that the selected signature indicates a specific scrambling code SC#k. 16 signatures of the CD-P are respectively mapped to indicate 16 different scrambling codes.

As described above, the mobile station transmits the CD-P mapped to indicate the specific scrambling code to the base station. The base station then transmits the ACK signal to the mobile station through the CD-ICH if it is determined that no channel collision exists in the received CD-P and an available PCPCH exists therein. At the same time, the base station transmits the CA-ICH to the mobile station.

The base station selects a scrambling code set Set#j that can use a specific scrambling code SC#k designated by the CD-P and maps the CA-ICH signatures to indicate the selected scrambling code set Set#j by the CA-ICH.

If the number of available scrambling code sets is 4, the base station maps CA#0~CA#3 to indicate a scrambling code set #0, CA#4~CA#7 to indicate a scrambling code set #1, CA#8~CA#11 to indicate a scrambling code set #2, and CA#12~CA#15 to indicate a scrambling code set #3. In this case, if the number of the scrambling code sets available in one cell is 16, 16 signatures are respectively mapped one-to-one with 16 different scrambling code sets.

Afterwards, the mobile station that received the CD-ICH and the CA-ICH detects scrambling codes required to transmit the message part through the CA-ICH, and uses them when transmitting the message part.

If the CPCHs are allocated by the above mapping methods, it is possible to support 64 CPCHs when the number of scrambling code sets that can be used in the cell is 4, while it is possible to support 256 CPCHs when the number of scrambling code sets is 16. Thus, since the channelization code of the PCPCHs uses a node $C_{2,0}$ having a spreading factor of 2 in the OVSF code tree, one scrambling code is allocated to one PCPCH to allocate the whole PCPCHs.

If one scrambling code set includes 16 scrambling codes, and if 4 scrambling codes are used in one cell, a maximum of 64 PCPCHs can be used. That is, since the mobile station informs the base station of data rate through the AP in the access step, a maximum of 256 PCPCHs can be used by using 16 CD-Ps and the CA-ICH.

A transmission procedure of the CPCH according to the third preferred embodiment will next be described.

The mobile station which desires to transmit packet data through the CPCH identifies a currently available (or non-available) CPCH referring to the CSICH transmitted from the base station. After the mobile station identifies the available maximum transmission rate, the mobile station tries to access the base station with a desired transmission data rate when a CPCH that can support the desired transmission data rate is vacant.

The mobile station then selects one AP signature and one access slot, and transmits an AP consisting of the selected AP signature and the access slot to the base station in compliance with a start point of the access slot. The mobile station next transmits the AP signature and the access slot to the base station in the access step, so as to inform the base station of a maximum data rate or a minimum spreading factor $SF_{min}$ in the message part required for data transmission.

The mobile station subsequently increases a transmission power to retransmit the AP in accordance with the start point of the access slot when an acquisition response of the AP is not received after a prescribed period of time. Such retransmission is repeated for a prescribed number of threshold times.

The base station receives the AP from the mobile station to determine a maximum data rate or a minimum spreading factor requested by the mobile station. Then, the base station determines whether to allocate a CPCH requested by the mobile station, by considering the available resources of the current CPCH and a total amount of traffic. As a result, if a desired CPCH can be allocated, the base station transmits the signature equal to the received AP signature to the mobile station as an ACK signal in compliance with the start point of the access slot. If the desired CPCH cannot be allocated, however, the base station transmits an inverted signature of the received AP signature to the mobile station as a NACK signal in compliance with the start point of the access slot.

When more than one mobile stations simultaneously transmit the AP with the same signature to the base station, the base station does not identify the mobile stations from the same signature. The base station accordingly transmits the ACK signal to all of the mobile stations. In this case, a collision of the CPCHs occurs. Thus, the mobile stations which received the ACK signal transmit the CD-P to the base station to prevent such a collision. At this time, the mobile station selects one of 16 signatures equal to 16 signatures of the AP to use it as the CD-P. Also, the mobile station maps a specific scrambling code set Set#j or a scrambling code SC#k to be used, with the signature of the selected CD-P and transmits it to the base station.

When the base station receives only one CD-P, the base station determines that a collision has not occurred, and transmits the signature equal to that of the received CD-P to the mobile station through the CD-ICH. However, when the base station receives more than one CD-P, the base station determines that a collision has occurred, and selects the CD-P having the highest power among the received CD-Ps to transmit the CD-ICH to the corresponding mobile station.

Furthermore, the base station transmits the CA-ICH containing CPCH information to be allocated in a signature format to the mobile station. At this time, the base station maps the CA-ICH signature with the specific scrambling code SC#k or scrambling code set Set#j and transmits them to the mobile station.

If the CD-P signature indicates the specific scrambling code set Set#j, then a scrambling code available in the designated scrambling code set Set#j is mapped with the CA-ICH signature. If the CD-P signature indicates the specific scrambling code SC#k, then the scrambling code set Set#j that can use the designated scrambling code is mapped with the CA-ICH signature.

The mobile station which received the CD-ICH and the CA-ICH then starts to transmit a message using the scrambling code designated by the CA-ICH. The mobile station controls transmitting power using the PC-P if necessary to transmit the message. The base station transmits the DL-DPCCH to the mobile station. The mobile station transmits the PC-P to the base station for a constant time of 0 or 8 slots before transmitting the message consisting of the data part and the control part in a physical channel format to the base station.

In transmission of the PCPCH, the mobile station uses a node $C_{2,0}$ having a spreading factor of 2 on the OVSF code tree against all of the CA-ICHs as a channelization code. In other words, the mobile station uses a node $C_{256,0}$ as a channelization code of the control part in the message part of the PCPCH and a node $C_{SF,SF/4}$ variable depending on the spreading factor as a channelization code of the data part.

The method for allocating a CPCH according to the embodiments of the present invention has many advantages. For example, it is possible to use 16 or more CPCHs by allocating scrambling codes used to transmit the message part using the CD-P and the CA-ICH.

Also, it is possible to allocate maximum 256 physical CPCHs with one access preamble signature. Accordingly, it is possible to easily allocate the CPCHs in even case that a reverse access channel (RACH) and the AP signature are used in common.

Next, since the allocation probability of 256 physical CPCHs is equal, system performance is not reduced and it is possible to efficiently support low data rate service in the next generation mobile communication system.

Additionally, when considering 16 signatures of the CA-ICH support spreading factors of 4~256, the CA-ICH is mapped with the scrambling code, so that other mobile stations can use other signatures of the CA-ICH without any interference, while a specific mobile station transmits data at high transmission rate. Accordingly, it is possible to efficiently use channel resources.

Furthermore, it is possible to allocate the channelization code of the message part in RACH or DPCH format. Also, since the 16 AP signatures support spreading factors of 4~256, it is possible to always select 16 AP signatures in even case that packet data are transmitted with any one of the spreading factors of 4~256. Accordingly, it is possible to remarkably reduce the probability of collision of the CPCHs.

Moreover, while the specific mobile station transmits data at high data transmission rate having a spreading factor of 4, the other mobile stations can use other AP signatures. Accordingly, it is possible to efficiently use limited channel resources.

Additionally, since the AP signatures are mapped with the scrambling codes regardless of the spreading factor of the transmission data, a mapping table is not required between the AP signatures and the scrambling codes. Accordingly, the system (or base station) does not require a broadcasting channel (BCH).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of transmitting a message through a common packet channel (CPCH) of a communication system, comprising:

receiving status information of each of a plurality of CPCHs from the system;
transmitting a first preamble to the system, said first preamble having one of a plurality of signatures, where each of a plurality of scrambling codes used for the CPCH has a one-to-one correspondence to a signature;
transmitting at least one second preamble to the system; and,
transmitting the message to the system through at least one —CPCH, wherein
a channelization code for a control part of the message is spread by a code $C_c=C_{256,0}$ of Orthogonal Variable Spreading Factor (OVSF) codes and a data part of the message is spread by a code $C_d=C_{SF,k}$ of the OVSF codes, and wherein SF is the spreading factor of the data part, and k=SF/y, wherein y is an integer greater than 0.

2. The method of claim 1, wherein the first preamble corresponds to an access preamble part of the CPCH, and each of the plurality of scrambling codes for the CPCH has a one-to-one correspondence to an access sub-channel used by the access preamble part of the CPCH.

3. The method of claim 1, wherein SF is 4, 8, 16, 32, 64, 128 or 256 and y is 4.

4. The method of claim 1, wherein the scrambling code corresponding to the signature is used to scramble the message of the CPCH.

5. The method of claim 1 or 4, wherein there are 64 uplink scrambling codes defined per cell and 32768 scrambling codes defined in the system.

6. The method of claim 5, wherein the 32768 scrambling codes are divided into 512 groups with 64 codes in each group and there is a one-to-one correspondence between the group of scrambling codes for the preamble in the cell and a primary scrambling code used in the downlink of the cell.

7. The method of claim 6, wherein an n:th scrambling code for the message corresponds to $S_{c\text{-}msg,n}$, where n=8192, 8193, . . . ,40959 is based on a scrambling sequence and n=64×m+k+8176, where m, k=16,17, . . . , 79 and m=0, 1, 2, . . . , 511.

8. The method of claim 7, wherein when long scrambling codes are used, $S_{c\text{-}msg,n}(i)=C_{long,n}(i)$, i=0, 1, . . . , 38399, where a lowest index corresponds to the chip transmitted first in time.

9. The method of claim 7, wherein when short scrambling codes are used, $S_{c\text{-}msg,n}(i)=C_{short,n}(i)$, i=0, 1, . . . , 38399.

10. A method for receiving a message through one of a plurality of common packet channels (CPCHs), comprising:
    transmitting status information of the plurality of CPCHs from a system to at least one mobile station;
    receiving at least one preamble having one of a plurality of signatures from the at least one mobile station by the system, wherein each of a plurality of scrambling codes used for the CPCH has a one-to-one correspondence to a signature;
    transmitting at least one indicator from the system to at least one mobile station in response to the at least one preamble; and
    receiving a message from the mobile station by the system through at least one CPCH, wherein
    a channelization code for a control part of the message corresponds to a code $C_c=C_{256,0}$ of Orthogonal Variable Spreading Factor (OVSF) codes and a channelization code for a data part of the message corresponds to a code $C_d=C_{SF,k}$ of the OVSF codes, and wherein SF is the spreading factor of the data part, and k=SF/y, wherein n is an integer greater than 0.

11. The method of claim 10, wherein the at least one preamble includes an access preamble and a collision detection preamble and at least one indicator comprises an acknowledgement signal and a collision detection indicator such that the system transmits the acknowledgment signal to the at least one mobile station in response to the access preamble and receives the collision detection preamble (CD-P) in response to the acknowledgment signal; and
    determines whether a collision has occurred.

12. The method of claim 11, wherein it is determined that a collision has not occurred when only one collision detection preamble is received, and it is determined that a collision has occurred when more than one collision detection preamble is received.

13. The method of claim 12, further comprising transmitting a signature equal to that of the collision detection preamble to the mobile station if no collision has occurred and transmitting a signature equal to that of the collision detection preamble having the highest power among received collision detection preambles from the system if a collision has occurred.

14. The method of claim 10, wherein SF is 4, 8, 16, 32, 64, 128 or 256 and y is 4.

15. The method of claim 10, wherein the scrambling code corresponding to the signature is used to scramble the message of the CPCH.

16. The method of claim 10 or 15, wherein there are 64 uplink scrambling codes defined per cell and 32768 scrambling codes defined in the system.

17. The method of claim 16, wherein the 32768 scrambling codes are divided into 512 groups with 64 codes in each group and there is a one-to-one correspondence between the group of scrambling codes for the preamble in the cell and a primary scrambling code used in the downlink of the cell.

18. The method of claim 17, wherein an n:th scrambling code for the message corresponds to $S_{c\text{-}msg,n}$, where n=8192, 8193, . . . ,40959 is based on a scrambling sequence and n=64×m+k+8176, where m, k=16,17, . . . , 79 and m=0, 1, 2, . . . , 511.

19. The method of claim 18, wherein when long scrambling codes are used, $S_{c\text{-}msg,n}(i)=C_{long,n}(i)$, i=0, 1, . . . , 38399, where a lowest index corresponds to the chip transmitted first in time.

20. The method of claim 18, wherein when short scrambling codes are used, $S_{c\text{-}msg,n}(i)=C_{short,n}(i)$, i=0, 1, . . . , 38399.

21. A method for transmitting a message through one of a plurality of common packet channels (CPCHs), comprising:
    transmitting status information of the CPCHs from a system to at least one mobile station;
    transmitting an access preamble (AP) having one of a plurality of signatures, wherein each of a plurality of scrambling codes used for the CPCH has a one-to-one correspondence to a signature and a channelization code for a control part of the message is spread by a code $C_c=C_{256,0}$ of Orthogonal Variable Spreading Factor (OVSF) codes and a data part of the message is spread by a code $C_d=C_{SF,k}$ of the OVSF codes, and wherein SF is the spreading factor of the data part, and k=SF/y, wherein y is an integer greater than 0; and
    transmitting the AP containing the signature from the system to the mobile station.

22. The method of claim 21, wherein the mobile station maps signatures of the CPCHs that can be serviced by the system with different scrambling codes.

23. The method of claim 21, wherein SF is 4, 8, 16, 32, 64, 128 or 256 and y is 4.

24. The method of claim 21, wherein the scrambling code corresponding to the signature is used to scramble the message of the CPCH.

25. The method of claim 21 or 24, wherein there are 64 uplink scrambling codes defined per cell and 32768 scrambling codes defined in the system.

26. The method of claim 25, wherein the 32768 scrambling codes are divided into 512 groups with 64 codes in each group and there is a one-to-one correspondence between the group of scrambling codes for the preamble in the cell and a primary scrambling code used in the downlink of the cell.

27. The method of claim 26, wherein an n:th scrambling code for the message corresponds to $S_{c\text{-}msg,n}$, where n=8192, 8193, ... ,40959 is based on a scrambling sequence and n=64×m+k+8176, where m, k=16,17, ..., 79 and m=0, 1, 2, ..., 511.

28. The method of claim 27, wherein when long scrambling codes are used, $S_{c\text{-}msg,n}(i)=C_{long,n}(i)$, i=0, 1, ..., 38399, where a lowest index corresponds to the chip transmitted first in time.

29. The method of claim 28, wherein when short scrambling codes are used, $S_{c\text{-}msg,n}(i)=C_{short,n}(i)$, i=0, 1, ..., 38399.

30. A method for transmitting a message through one of a plurality of common packet channels (CPCHs), comprising:
transmitting status information of the CPCHs from a system to at least one mobile station;
transmitting an access preamble (AP) having one of a plurality of signatures, wherein each of a plurality of scrambling codes used for the CPCH has a one-to-one correspondence to a signature and a channelization code for a control part of the message is spread by a code $C_c=C_{256,0}$ of Orthogonal Variable Spreading Factor (OVSF) codes and a data part of the message is spread by a code $C_d=C_{SF,k}$ of the OVSF codes, and wherein SF is the spreading factor of the data part, and k=SF/y, wherein y is an integer greater than 0; and
transmitting the AP containing the signature from the system to the mobile station, wherein the mobile station divides a specific scrambling code into chip codes of a prescribed length, and the signatures of the CPCHs are mapped with the divided scrambling chip codes.

31. A method for transmitting a message through one of a plurality of common packet channels (CPCHs), comprising:
transmitting status information of the CPCHs from a system to at least one mobile station;
transmitting an access preamble (AP) having one of a plurality of signatures, wherein each of a plurality of scrambling codes used for the CPCH has a one-to-one correspondence to a signature and a channelization code for a control part of the message is spread by a code $C_c=C_{256,0}$ of Orthogonal Variable Spreading Factor (OVSF) codes and a data part of the message is spread by a code $C_d=C_{SF,k}$ of the OVSF codes, and wherein SF is the spreading factor of the data part, and k=SF/y, wherein y is an integer greater than 0; and
transmitting the AP containing the signature from the system to the mobile station, wherein the mobile station selects a code located in an up branch from a node having a spreading factor of 2 in a code tree of the scrambling codes as a channelization code of the data part, and selects a code located last among a plurality of codes of a down branch from the node having the spreading factor of 2 as a channelization code of the control part.

32. A method for transmitting a message through one of a plurality of common packet channels (CPCHs), comprising:
transmitting status information of the CPCHs from a system to at least one mobile station;
transmitting an access preamble (AP) having one of a plurality of signatures, wherein each of a plurality of scrambling codes used for the CPCH has a one-to-one correspondence to a signature and a channelization code for a control part of the message is spread by a code $C_c=C_{256,0}$ of Orthogonal Variable Spreading Factor (OVSF) codes and a data part of the message is spread by a code $C_d=C_{SF,k}$ of the OVSF codes, and wherein SF is the spreading factor of the data part, and k=SF/y, wherein y is an integer greater than 0; and
transmitting the AP containing the signature from the system to the mobile station, wherein the mobile station selects a code located last among a plurality of codes in an up branch from a node having a spreading factor of 2 as a channelization code of the control part, selects a lower node of two nodes having a spreading factor of 4 from a node having a spreading factor of 2, and selects one of a plurality of codes in the up branch from the selected lower node as a channelization code of the data part.

33. A method for transmitting a message through one of a plurality of common packet channels (CPCHs), comprising:
transmitting status information of the CPCHs from a system to at least one mobile station;
transmitting an access preamble (AP) having one of a plurality of signatures, wherein each of a plurality of scrambling codes used for the CPCH has a one-to-one correspondence to a signature and a channelization code for a control part of the message is spread by a code $C_c=C_{256,0}$ of Orthogonal Variable Spreading Factor (OVSF) codes and a data part of the message is spread by a code $C_d=C_{SF,k}$ of the OVSF codes, and wherein SF is the spreading factor of the data part, and k=SF/y, wherein y is an integer greater than 0; and
transmitting the AP containing the signature from the system to the mobile station, wherein a number of the scrambling codes mapped with the signature is equal to 32 divided by a minimum spreading factor.

34. A method for allocating common packet channels (CPCHs), comprising:
transmitting status information of a plurality of CPCHs from a system to a mobile station;
selecting a desired CPCH in accordance with the status information;
transmitting an access preamble (AP), comprising a signature indicative of the selected CPCH, a minimum spreading factor of the CPCH, and a maximum data rate, to the system;
transmitting a channel allocation indicator of at least one of the plurality of CPCHs to be allocated, from the system to the mobile station in accordance with the minimum spreading factor and the maximum data rate received from the mobile station, the channel allocation indicator having a signature mapped with at least one scrambling code such that there is a one-to one correspondence between each of a plurality of scrambling codes used for the CPCH and the signature; and
transmitting a message from the mobile station to the system using channelization codes of a data part and a control part in the message part being selected in the code tree, wherein the system divides a specific scrambling code into chip codes of a prescribed length, and the respective signatures of the channel allocation indicator are mapped with the divided chip codes.

35. A method for allocating common packet channels (CPCHs), comprising:
transmitting status information of a plurality of CPCHs from a system to a mobile station;
selecting a desired CPCH in accordance with the status information;
transmitting an access preamble (AP), comprising a signature indicative of the selected CPCH, a minimum spreading factor of the CPCH, and a maximum data rate, to the system;

transmitting a channel allocation indicator of at least one of the plurality of CPCHs to be allocated, from the system to the mobile station in accordance with the minimum spreading factor and the maximum data rate received from the mobile station, the channel allocation indicator having a signature mapped with at least one scrambling code such that there is a one-to one correspondence between each of a plurality of scrambling codes used for the CPCH and the signature; and transmitting a message from the mobile station to the system using channelization codes of a data part and a control part in the message part being selected in the code tree, wherein the mobile station selects one of a plurality of codes located in an up branch from a node having a spreading factor of 2 in a code tree of the scrambling codes as a channelization code of the data part, and selects a code located last among a plurality of codes of a down branch from the node having the spreading factor of 2 as a channelization code of the control part.

36. A method for allocating common packet channels (CPCHs), comprising:

transmitting status information of a plurality of CPCHs from a system to a mobile station;

selecting a desired CPCH in accordance with the status information;

transmitting an access preamble (AP), comprising a signature indicative of the selected CPCH, a minimum spreading factor of the CPCH, and a maximum data rate, to the system;

transmitting a channel allocation indicator of at least one of the plurality of CPCHs to be allocated, from the system to the mobile station in accordance with the minimum spreading factor and the maximum data rate received from the mobile station, the channel allocation indicator having a signature mapped with at least one scrambling code such that there is a one-to one correspondence between each of a plurality of scrambling codes used for the CPCH and the signature; and transmitting a message from the mobile station to the system using channelization codes of a data part and a control part in the message part being selected in the code tree, wherein the mobile station selects a code located last among a plurality of codes in an up branch from a node having a spreading factor of 2 as a channelization code of the control part, selects a lower node of two nodes having a spreading factor of 4 from a node having a spreading factor of 2, and selects one of a plurality of codes in the up branch from the selected lower node as a channelization code of the data part.

37. A method for allocating common packet channels (CPCHs), comprising:

transmitting status information of a plurality of CPCHs from a system to a mobile station;

selecting a desired CPCH in accordance with the status information;

transmitting an access preamble (AP), comprising a signature indicative of the selected CPCH, a minimum spreading factor of the CPCH, and a maximum data rate, to the system;

transmitting a channel allocation indicator of at least one of the plurality of CPCHs to be allocated, from the system to the mobile station in accordance with the minimum spreading factor and the maximum data rate received from the mobile station, the channel allocation indicator having a signature mapped with at least one scrambling code such that there is a one-to one correspondence between each of a plurality of scrambling codes used for the CPCH and the signature; and transmitting a message from the mobile station to the system using channelization codes of a data part and a control part in the message part being selected in the code tree, wherein the number of the scrambling codes mapped with the respective signatures of the channel allocation indicator is equal to 32 divided by the minimum spreading factor.

38. A method of spreading a message part for a common packet channel, comprising:

spreading a control part of said message part by a code $C_c = C_{256,0}$ of Orthogonal Variable Spreading Factor (OVSF) codes and spreading a data part of said message part by a code $C_d = C_{SF,k}$ of the OVSF codes, wherein SF is the spreading factor of the data part, and wherein k=SF/4.

39. The method of claim 38, wherein the data part uses the code from spreading factor 4 to 256.

40. The method of claim 38, wherein there are 64 uplink scrambling codes defined per cell and 32768 scrambling codes defined in the system.

41. The method of claim 40, wherein the 32768 scrambling codes are divided into 512 groups with 64 codes in each group and there is a one-to-one correspondence between the group of scrambling codes for the preamble in the cell and a primary scrambling code used in the downlink of the cell.

42. The method of claim 41, wherein an n:th scrambling code for the message corresponds to $S_{c\text{-}msg,n}$, where n=8192, 8193, . . . ,40959 is based on a scrambling sequence and n=64×m+k+8176, where m, k=16,17, . . . , 79 and m=0, 1, 2, . . . , 511.

43. The method of claim 42, wherein when long scrambling codes are used, $S_{c\text{-}msg,n}(i)=C_{long,n}(i)$, i=0, 1, . . . , 38399, where a lowest index corresponds to the chip transmitted first in time.

44. The method of claim 42, wherein when short scrambling codes are used, $S_{c\text{-}msg,n}(i)=C_{short,n}(i)$, i=0, 1, . . . , 38399.

45. A method of spreading a message part for a common packet channel, comprising:

spreading control part of said message part by a code $C_c=$ as $C_{256,128}$ of Orthogonal Variable Spreading Factor (OVSF) codes; and spreading a data part of said message part by a code $C_d=C_{SF,k}$ of the OVSF codes, wherein SF is the spreading factor of the data part, and wherein k=3*SF/4.

46. The method of claim 45, wherein the data part uses the code from spreading factor 4 to 256.

* * * * *

UNITED STATES PATENT AND TRADEMARK OFFICE
CERTIFICATE OF CORRECTION

PATENT NO.        : 7,058,038 B2                                        Page 1 of 1
APPLICATION NO.   : 09/773574
DATED             : June 6, 2006
INVENTOR(S)       : Seung June Yi, Young Dae Lee and Sung Lark Kwon It is certified that error appears in the above-identified patent and that said Letters Patent is hereby corrected as shown below:

Claim 1, line 14, change "—CPCH" to --CPCH--

Claim 10, line 21, change "n" to --y--

Signed and Sealed this

Twenty-ninth Day of August, 2006

JON W. DUDAS
*Director of the United States Patent and Trademark Office*